United States Patent [19]
Abe

[11] Patent Number: 6,115,382
[45] Date of Patent: Sep. 5, 2000

[54] PERMANENT VIRTUAL CONNECTION RESERVATION CONTROL SYSTEM

[75] Inventor: Hiroaki Abe, Kanagawa, Japan

[73] Assignee: Fujitsu Limited, Kanagawa, Japan

[21] Appl. No.: 09/040,853

[22] Filed: Mar. 18, 1998

[30] Foreign Application Priority Data

May 30, 1997 [JP] Japan ..................... 9-142709

[51] Int. Cl.$^7$ ................................. H04L 12/56
[52] U.S. Cl. ........................... 370/395; 370/399
[58] Field of Search ..................... 370/395, 399, 370/397, 230, 235, 410, 392, 409

[56] References Cited

U.S. PATENT DOCUMENTS

| | | | |
|---|---|---|---|
| 5,530,698 | 6/1996 | Kozaki et al. | 370/395 |
| 5,633,868 | 5/1997 | Baldwin et al. | 370/331 |
| 5,636,212 | 6/1997 | Ikeda | 370/233 |
| 5,680,396 | 10/1997 | Moritomo et al. | 378/392 |
| 5,784,358 | 7/1998 | Smith et al. | 370/230 |
| 5,805,072 | 9/1998 | Kakemizu | 340/825.03 |
| 5,894,471 | 4/1999 | Miyagi et al. | 370/230 |
| 5,896,496 | 4/1999 | Suzuki | 395/185.01 |
| 5,953,338 | 9/1999 | Ma et al. | 370/395 |
| 5,978,372 | 11/1999 | Tsutsui | 370/392 |

FOREIGN PATENT DOCUMENTS 630021 2/1994 Japan.

*Primary Examiner*—Douglas W. Olms
*Assistant Examiner*—Ken Vanderpuye
*Attorney, Agent, or Firm*—Helfgott & Karas, PC.

[57] ABSTRACT

A path defining/changing/deleting section sets in advance the definition of the setup of a PVC connection in a PVC connection object management table as a PVC connection object. Each PVC connection object has an attribute indicating an active or inactive state. When a request is made by a reservation controlling section for activating or deactivating an object PVC connection, a PVC active/inactive state controlling section can immediately read from the PVC connection object management table a PVC connection object indicating the definition of the setup of the object PVC connection, to send commands based on the definition to each of network elements (NE) which comprise an information communications network.

20 Claims, 25 Drawing Sheets

| CLASSIFICATION (CONTENTS) | STATE TYPE | MEANING |
|---|---|---|
| State (PVC'S STATE) | Inactive : | STATE WHERE PVC IS HELD ONLY AS LOGICAL DATA IN NMS AND IS NOT WORKING ON NETWORK DOMAIN COMPOSED OF ATM SWITCHING SYSTEMS |
| | Active : | STATE WHERE PVC IS RESERVED NOT ONLY IN NMS BUT ON NETWORK DOMAIN COMPOSED OF ATM SWITCHING SYSTEMS AND ACTUALLY WORKING |
| Schedule (SCHEDULE-RESERVED STATE) | Scheduled : | STATE WHERE SOME SCHEDULE HAS ALREADY RESERVED |
| | non : | STATE WHERE ANY SCHEDULE HAS NOT RESERVED YET |

FIG. 5

| CLASSIFICATION | INPUT/REQUEST ITEM | PERSON IN CHARGE | |
| --- | --- | --- | --- |
| | | Operator | ADMINISTRATOR |
| PVC CONNECTION-RELATED | CONNECTION CREATE | O | |
| | CONNECTION CHANGE | O | |
| | CONNECTION DELETE | O | |
| | CONNECTION REFERENCE | O | |
| | CONNECTION SYNC CHECK | O | |
| PVC STATE CONTROL-RELATED | CONNECTION ACTIVATE | O | |
| | CONNECTION DEACTIVATE | O | |
| SCHEDULE CONTROL-RELATED | SCHEDULE SET | O | |
| | SCHEDULE UPDATE | O | |
| | SCHEDULE CANCEL | O | |
| | SCHEDULE CONTENTION CHECK | O | |
| SCHEDULE CONDITION SETUP INPUT/REQUEST | SCHEDULE CONTENTION CHECK TYPE INQUIRY | O | O |
| | SCHEDULE CONTENTION CHECK LEVEL INQUIRY | O | O |
| | SCHEDULE SETTING TIME INTERVAL CHANGE | | O |

FIG. 7

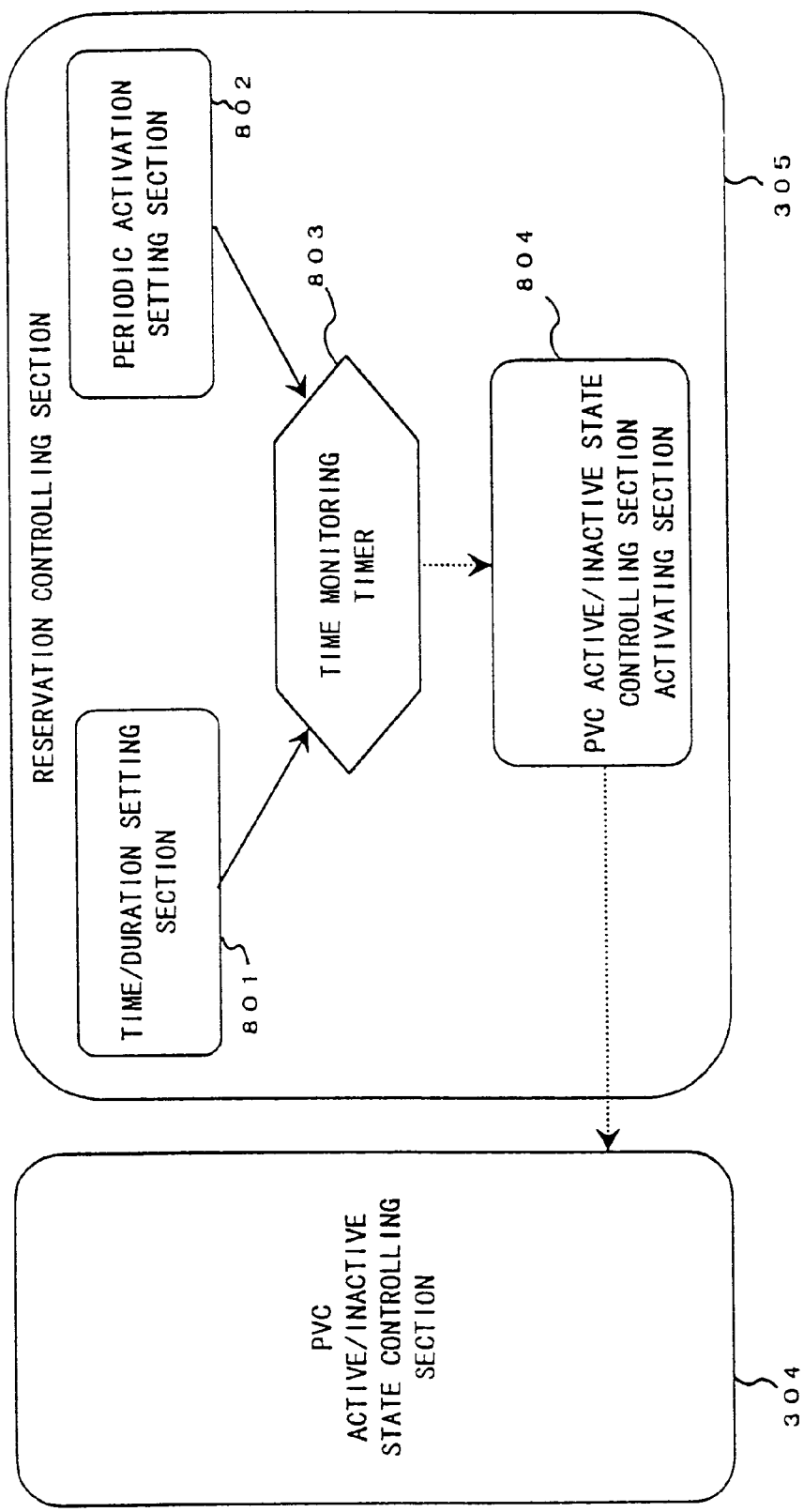
F I G. 8

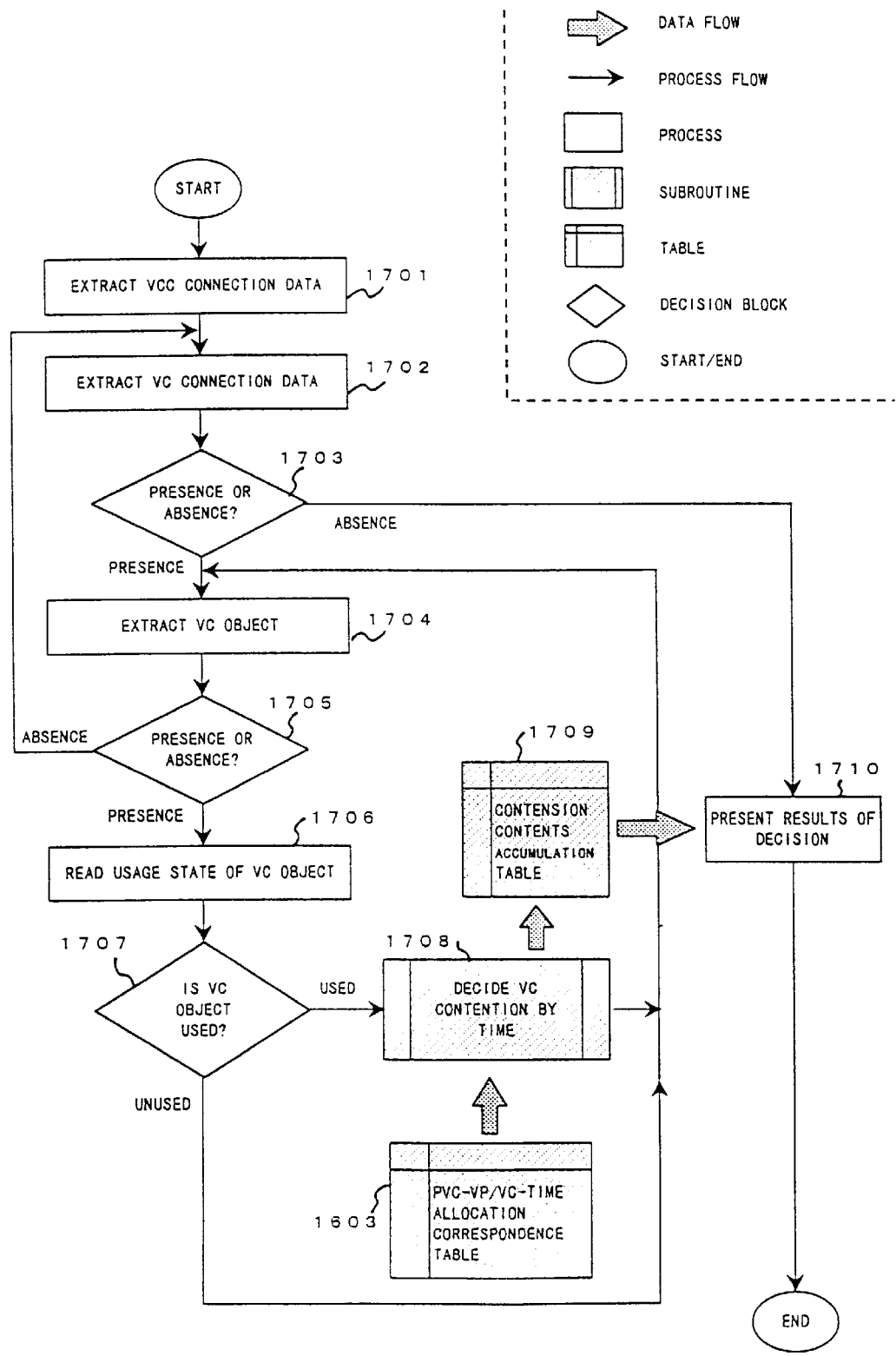
F I G. 17

PERMANENT VIRTUAL CONNECTION RESERVATION CONTROL SYSTEM

BACKGROUND OF THE INVENTION

1. Field of the Invention

The present invention relates to a connection reservation control system for use with information communications networks such as ATM switching system networks which permit permanent virtual connections to be set up using virtual connection units.

2. Description of the Related Art

An ATM (Asynchronous Transfer Mode) switching system network (hereinafter referred to as a network domain) is a network in which plurality of ATM switching systems (hereinafter referred to as network elements (NEs)) are connected by physical line interfaces. An ATM network management system (hereinafter referred to as NMS: Network Management System) is a system that has the functions of resource management, connection management, failure (alarm) management, security management, traffic management, etc., for the purpose of managing an ATM switching system network, in particular.

As a unit for connecting each NE or line organically in a network domain, a primitive virtual connection unit, such as a VP (Virtual Path) or a VC (Virtual Channel), is known.

As shown in FIG. 1, the VP or VC is defined as allocated to a physical link that connects together network interfaces (User Network Interfaces (UNI)/Network Network Interfaces (NNI)) of the respective NEs, thereby reserving a Permanent Virtual Channel (PVC) connection which is an end-to-end permanent virtual connection.

The PVC connection occupies a portion of the fixed bandwidth of a line interface all the time. To permit efficient utilization of the line interface, therefore, the demand for implementing a reservation controlling function on PVC connections has been increasing. If the bandwidth occupancy varies widely from hour to hour or from day to day, then there will arise a need for such a type of connection management as distributing connections according to the varying occupancy changes from hour to hour or from day to day.

These facts mean that the reservation controlling function of switching PVC connections from hour to hour is closely linked with the connection management function for the PVC connection. Thus, how to link the two network functions with each other for efficient utilization of lines will be an important problem to be solved by the ATM network management system.

Information communications networks, particularly ATM switching system networks, are now in the process of standardization by many international network organizations such as TMN, OSI, etc., or NE vendors. Thus, the ATM network management system is employed by each network organization or NE vendor. An important problem that confronts ATM network system operators is how to maintain a balance between a reduction of the cost of installation of facilities to make up a network and the reservation of the line bandwidth for PVC connections that customers use. From this point of view as well, an ATM network management system has been demanded in which the PVC connection reservation controlling function and the connection management function of the PVC connection are combined with each other organically.

As an ATM network management system, a product having the functions of resource management, connection management, failure (alarm) management, security management, and traffic management within a network domain is known conventionally. The function of setting up an end-to-end PVC connection between each NE has already been put to practical use as a portion of a conventional connection management function.

Moreover, a PVC connection reservation controlling function has already been put to practical use which is arranged such that NEs each include a command file necessary to set up PVC connections, and a set of commands described in the command files is activated at a specified time.

Furthermore, in STM (Synchronous Transfer Mode) switching system networks which are conventional general line switching networks, a reservation controlling function has been implemented which generates or removes a private line at a specified time.

For a network domain composed of a plurality of ATM switching systems, end-to-end PVC connection setup and reservation controlling function requirements have been recognized. However, the fact is that no specific techniques or system products for implementing the function exist.

That is, the conventional ATM network management systems have no connection reservation controlling function linked with the PVC connection setup and cannot flexibly meet a request to switch PVC connections from hour to hour and a situation requiring transmission of a large number of cells at regular intervals.

Thus, with the conventional systems, it is required to set up an end-to-end PVC connection between each NE. The connection setup involves setting many parameters such as a route, a quality level, etc., which increases the possibility that human errors may creep in.

On the other hand, in the conventional system in which a command file is set up for each NE and a set of commands described in the command files is activated at a specified time, there is the possibility that a mismatch may occur among data on a location to which a connection is to be made, which are placed in the command files of the respective NEs to set up one PVC connection. The occurrence of a mismatch will result in failure to set up that PVC connection normally.

SUMMARY OF THE INVENTION

In view of the prior art systems described above, it is an object of the present invention to implement efficient, accurate PVC connection reservation control over a network domain such as an ATM switching system network.

The present invention is directed to a device for performing reservation control to set up a permanent virtual connection (PVC) using virtual connection units on an information communications network (network domain) by making communications with each network element device (NE 202) which comprise the information communications network.

A permanent virtual connection setup management unit (PVC connection object management table 306) manages data used for setting up the permanent virtual connection.

A reservation controlling unit (reservation controlling section 305) controls a setting schedule for the permanent virtual connection managed by the permanent virtual connection setup management unit.

An active/inactive state controlling unit (PVC active/inactive state controlling section 304) is responsive to a request issued by the reservation controlling unit to switch the state of the permanent virtual connection for switching the permanent virtual connection managed by the permanent virtual connection setup management unit between active and inactive states and issues a request to network element devices that hold resources which will be used by the permanent virtual connection for changing the states of the resources.

In general, the definition of setup of a permanent virtual connection, such as a PVC connection, involves the definition of many parameters such as determination of a route, determination of a quality level, etc. Thus, redefining the definition of the setup of the permanent virtual connection at each reserved time involves a great workload. In the invention, therefore, the permanent virtual connection setup data is managed in advance by the permanent virtual connection setup management unit. The active/inactive state controlling unit responds to a state switching request by the reservation controlling unit to switch the permanent virtual connection managed by the management unit between active and inactive states and make a request to the network element devices for switching the state of the resources. This allows each of the network element devices to switch the state of the permanent virtual connection quickly and accurately.

The reservation controlling unit may be configured to include fixed-interval reservation unit (time/duration setting section 801) for reserving the setup of the permanent virtual connection for a given fixed interval, periodic reservation unit (periodic activation setting section 802) for reserving the setup of the permanent virtual connection periodically, time monitoring timer unit (time monitoring timer 803) for performing time monitoring according to the contents of reservation by the fixed-interval reservation unit or the periodic reservation unit, and state switching request issuing unit (PVC active/inactive state controlling section activating section 804) responsive to the results of the time monitoring by the timer unit for issuing the request for switching the states of the resources to the active/inactive state controlling unit.

This provides great freedom in reservation control.

The device of the invention so far may be arranged to further comprise contention checking unit (contention checking section 1101) for checking whether or not, in a schedule set by the reservation controlling unit for the permanent virtual connection, the resources of the network element devices that are used by the permanent virtual connection are used by another schedule already set by the reservation controlling unit.

The contention checking unit includes network element device inquiring/checking unit (scenario developing section 1102 and contention deciding section 1103) for inquiring of the network element devices to check whether or not, in a schedule set by the reservation controlling unit for the permanent virtual connection, the resources of the network element devices that are to be used by the permanent virtual connection are used overlapping with another schedule already set by the reservation controlling unit.

This contention checking unit directly inquires each of the network element devices as to the usage of each resource the scheduled permanent virtual connection will use, allowing the presence or absence of contention for the scheduled permanent virtual connection to be checked in real time.

The contention checking unit further comprises permanent virtual connection-resource correspondence storage unit (PVC-VP/VC allocation table 1303) for storing a correspondence relationship between the permanent virtual connection and the resources of the network element devices that are used by the permanent virtual connection, and permanent virtual connection-resource correspondence checking unit (PVC-VP/VC correspondence checking section 1302) for referencing the permanent virtual connection-resource correspondence storage unit to check whether or not, in a schedule set by the reservation controlling unit for the permanent virtual connection, the resources of the network element devices that are to be used by the permanent virtual connection are used overlapping with another schedule already set by the reservation controlling unit.

This contention checking unit allows the contention situations of each element device of the scheduled permanent virtual connection to be checked on the basis of resource information stored in the permanent virtual connection-resource correspondence storage unit. As a result, the need for issuing commands to the network element devices and receiving responses therefrom is eliminated, thus ensuring fast contention checking.

The contention checking unit further comprises permanent virtual connection-resource-time correspondence storage unit (PVC-VP/VC-time allocation correspondence table 1603) for storing a correspondence relationship among the permanent virtual connection, the resources of the network element devices that are used by the permanent virtual connection, and the time interval for which the permanent virtual connection is set up, and permanent virtual connection-resource-time correspondence checking unit (PVC-VP/VC-time correspondence checking section 1602) for referencing the permanent virtual connection-resource-time correspondence storage unit to check whether or not, in a schedule set by the reservation controlling unit for the permanent virtual connection, the resources of the network element devices that are to be used by the permanent virtual connection are used overlapping with another schedule already set by the reservation controlling unit in units of a predetermined time interval.

This contention checking unit allows the permanent virtual connection to be switched on a time unit, providing efficient utilization of bandwidth resources at highly used line interfaces.

The embodiment of the present invention may be configured to further include unit for changing the unit of a predetermined time interval which is a unit of scheduling in the contention checking unit.

This allows the network operating administrator to change the scheduling time interval according to the allowance for bandwidth, the accuracy required of schedule contention checking, and the performance of checking processing. Thus, more accurate PVC connection reservation control becomes possible.

A control switching unit may be included which switches control among the network element equipment inquiring/checking unit, the permanent virtual connection-resource correspondence checking unit, and the permanent virtual connection-resource-time correspondence checking unit.

This allows a permanent virtual connection to be scheduled flexibly to meet the needs of the network operating administrator.

The present invention can be implemented in the form of a computer-readable storage medium which, when used by a computer, permits it to perform the same functions as described above.

Finally, the present invention has an advantage that there is no need to modify existing network element devices, such as ATM switching system, etc., for permanent virtual connection reservation control.

BRIEF DESCRIPTION OF THE PREFERRED EMBODIMENTS

Other objects and advantages of the present invention will be apparent to those skilled in the art from the following description of the preferred embodiments of the invention in conjunction with the accompanying drawings in which:

FIG. 5 shows an example of a state type in the PVC connection reservation control;

FIG. 7 shows the contents of input/request items in the PVC connection reservation control;

FIG. 8 shows a configuration for a schedule reservation controlling function;

FIG. 17 shows an operational flowchart (No. 1) for the contention checking process (No. 3);

DESCRIPTION OF THE PREFERRED EMBODIMENTS

Basic Configuration

In the first place, a basic configuration of the preferred embodiment of the present invention will be described with reference to FIGS. 2 through 7.

Figure 1:
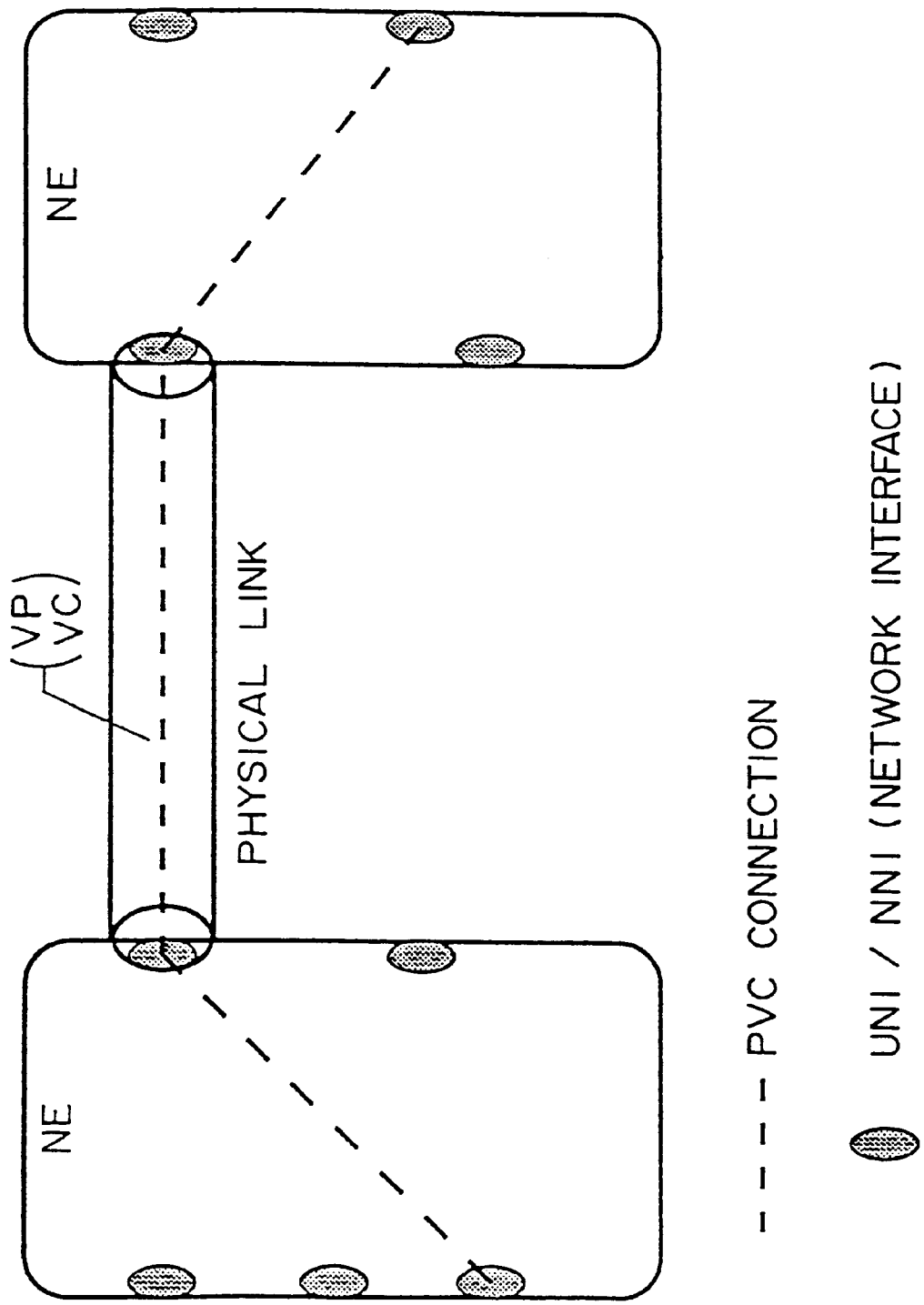
FIG. 1 is a diagram of a PVC connection.
Figure 2:
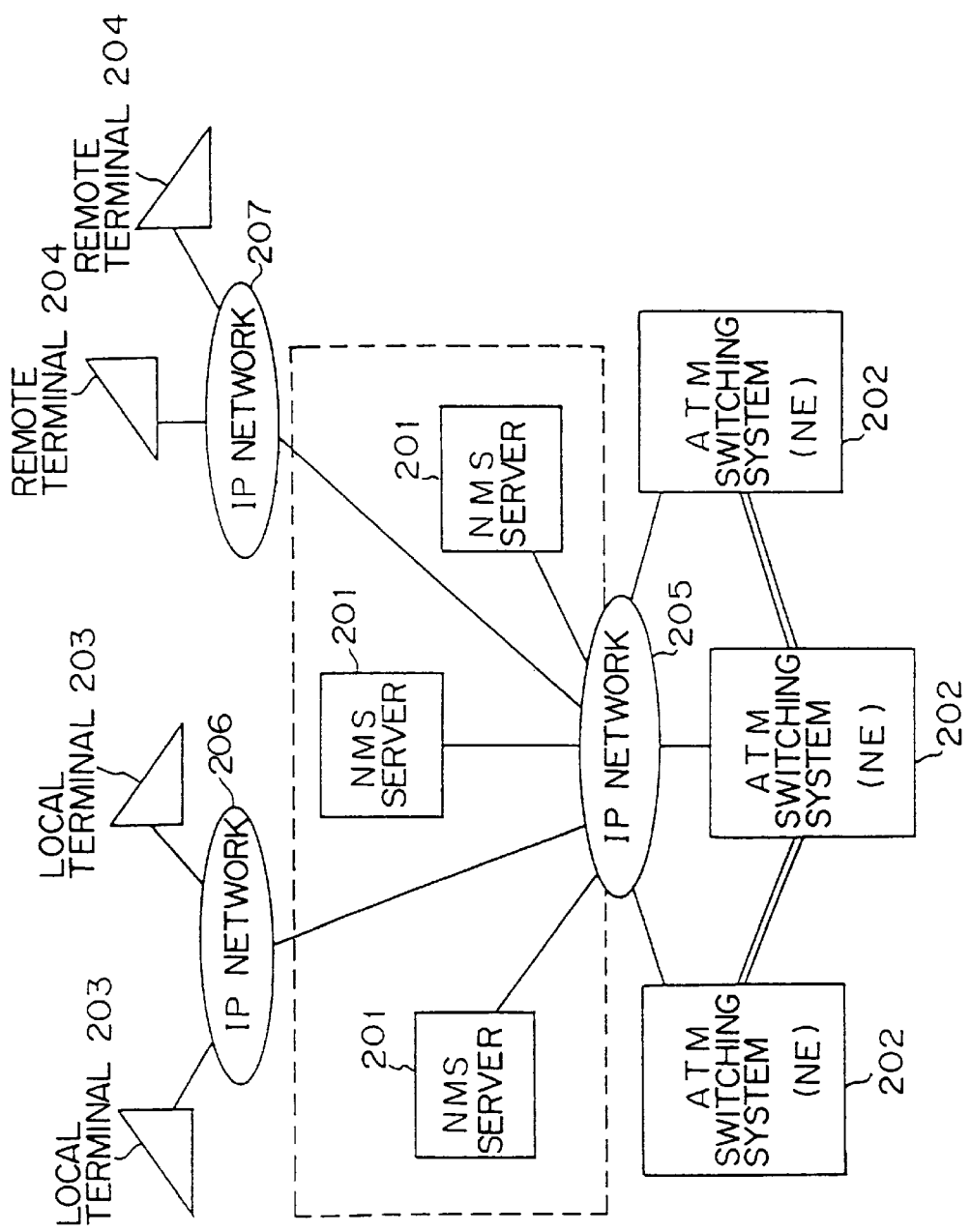
FIG. 2 is a schematic diagram of an NMS network according to an embodiment of the present invention.

FIG. 2 is a schematic of an NMS network of the present invention.

NMS servers 201 are connected to a network domain composed of a plurality of NEs 202, or ATM switching systems, through an IP (Internet Protocol) network 205 which is a network based on the IP protocol which is a standard protocol for the Internet and so on. The NMS server 201 implements end-to-end PVC connection setup and reservation control on the network domain composed of a plurality of NEs 202. The NMS network needs not necessarily to be an IP network but may be any other network.

Each NMS server 201 is operated from local terminals 203 which are connected to a local IP network 206 or remote terminals 204 connected to another IP network 207.

Figure 3:
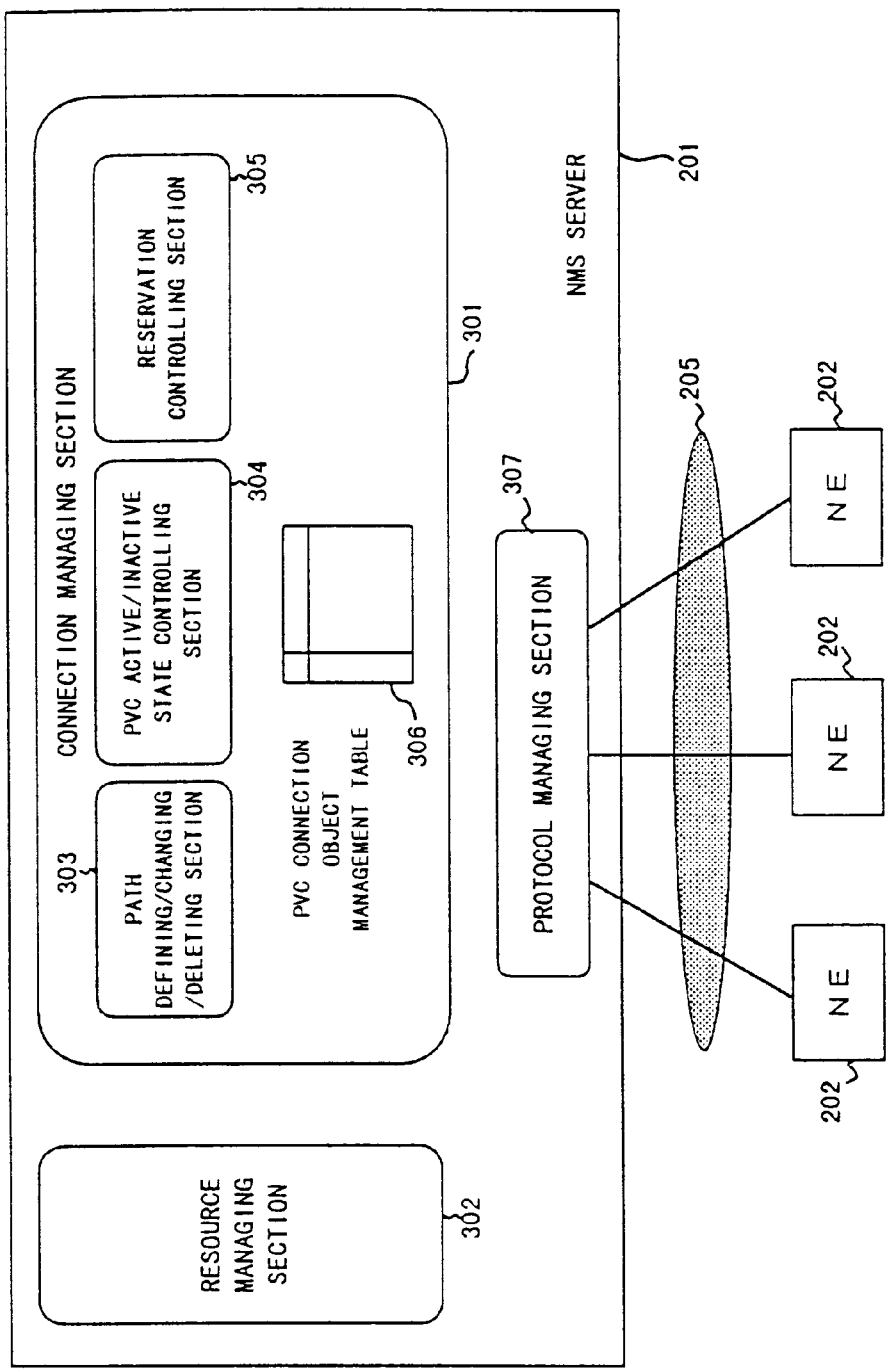
FIG. 3 shows an internal configuration of the NMS server of FIG. 2.

FIG. 3 shows a configuration of the preferred embodiment of each of the NMS servers 201 of FIG. 2.

A resource managing section 302 manages data on elements (resources) such as types, interfaces and bandwidths of lines or communications units of each NE 202 within the network domain that the corresponding NMS server 201 manages and VPs and VCs set in each NE 202.

A protocol managing section 307 transfers commands and responses between the NMS server which include the protocol managing section 307 and each NE 202 within the network domain which is managed by the protocol managing section 307 through the IP network 205 in accordance with a specific communications protocol (for example, the TL/1 protocol) as shown in FIG. 2.

A connection managing section 301 controls the setup/release of PVC connections to each NE 202 within the network domain that the corresponding NMS server 201 manages.

A path defining/changing/deleting section 303 in the connection managing section 301 has a function of defining, changing or deleting a PVC connection path as instructed by an operator who operates the NMS server 201 from a local terminal 203 or a remote terminal 204 shown in FIG. 2. Data on a PVC connection defined by the path defining/changing/deleting section 303 is entered into a PVC connection object management table 306 in the connection managing section 301.

A reservation controlling section 305 defines and changes schedule data that specifies the time of switching the current state of each PVC connection object as the objects in the PVC connection object management table 306 and performs time monitoring on the basis of the defined schedule time data. When the current time reaches the specific time indicated by schedule time data set in the reservation controlling section 305 for a PVC connection object in the PVC connection object management table 306, the reservation controlling section 305 makes a request to a PVC active/inactive state controlling section 304 in the connection managing section 301 for switching the state of the object PVC connection.

Upon receipt of the request to switch the object PVC connection's state, the PVC active/inactive state controlling section 304 extracts the PVC connection object corresponding to the object PVC connection from the PVC connection object management table 306 and, based on the schedule data and the defined data for setup of the object PVC connection which are set therein, issues to each NE 202 of FIG. 2 through the resource managing section 302, the protocol managing section 307 and the IP network 205 (FIG. 2), commands which are required to activate or deactivate the state of the object PVC connection. As a result, the commands are processed normally in each NE 202, so that the object PVC connection is set up or released in the network domain composed of the NEs 202.

The results of the setup/release of the object PVC connection in each NEs 202 are sent, as a response indicating normal termination, to the PVC active/inactive state controlling section 304 in the connection managing section 301 in each NMS server 201 through its protocol managing section 307 and resource managing section 302. As a result, the PVC active/inactive state controlling section 304 switches the state of that PVC connection object in the PVC connection object management table 306 which corresponds to the object PVC connection from active to inactive or from inactive to active on the basis of the schedule data set as its attribute.

The feature of this embodiment related to the present invention is that, in the configuration of FIG. 3, the connection managing section 301 is provided with the PVC active/inactive state controlling section 304 and the reservation controlling section 305. The definition of the setup of a PVC connection involves the definition of many parameters, such as determination of route, determination of quality level, etc. Thus, redefining the setup of the PVC connection at each reserved time will involve a great workload. In this embodiment, therefore, the path defining/changing/deleting section 303 previously sets the definition of the setup of a PVC connection in the PVC connection object management table 306 as a PVC connection object. Each PVC connection object has an attribute indicating its active or inactive state. When a request is made by the reservation controlling section 305 for activating or deactivating an object PVC connection, such a configuration permits the PVC active/inactive state controlling section 304 to immediately read from the PVC connection object management table 306 a PVC connection object indicating the definition of setup of that object PVC connection and to quickly issue commands based on that definition to each NE 202.

Figure 4:
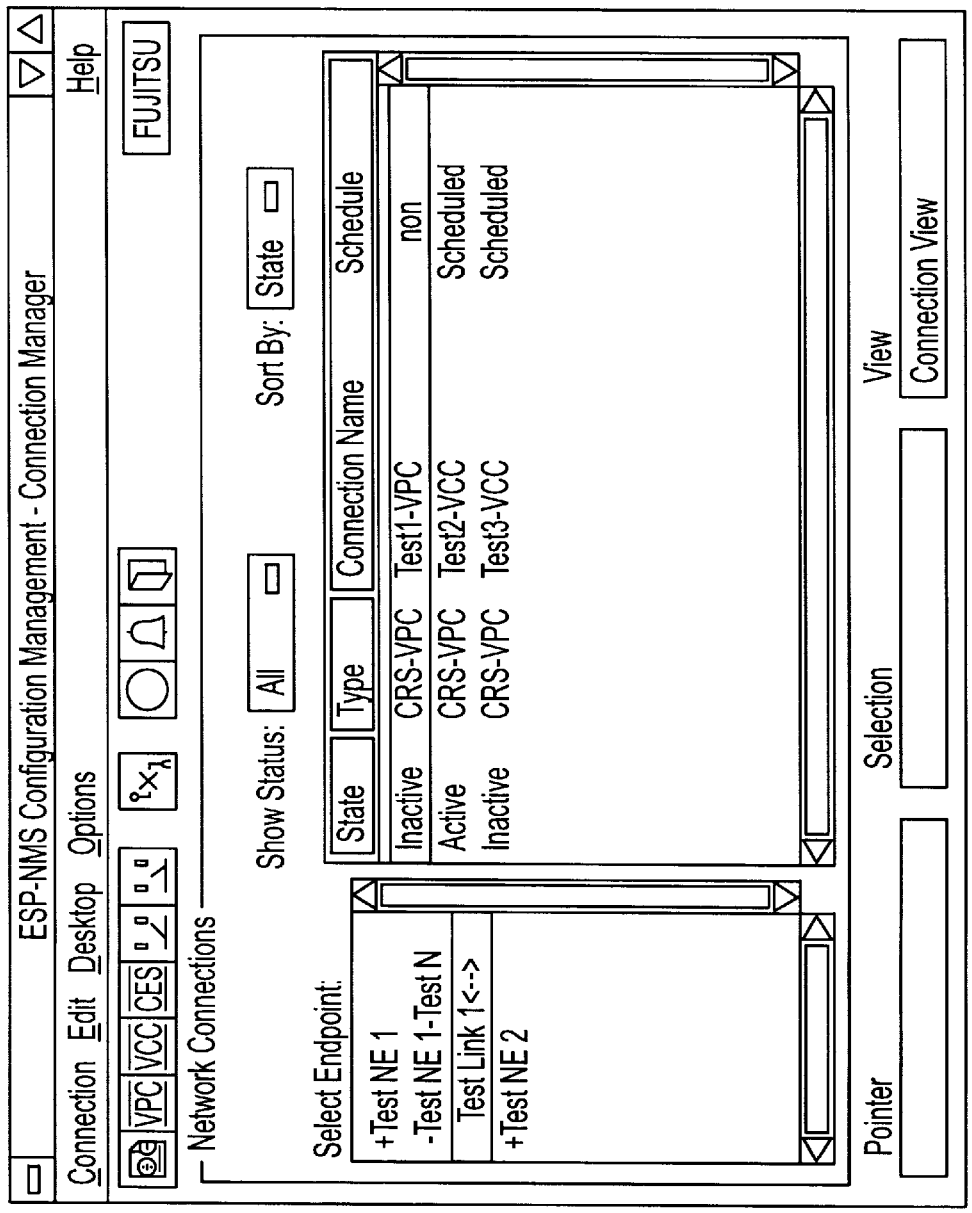
FIG. 4 shows an example of a PVC connection reservation control display screen.

FIG. 4 shows an example of a display screen for PVC connection reservation control window implemented by the configuration of FIG. 3.

NEs 202 (FIG. 2), which are endpoints of an end-to-end PVC connection and a physical link, are displayed hierarchically in the "Select Endpoint" display area.

On the right-hand side of that display area, a list of PVC connections is selected which are managed on the NMS server 201 for the endpoint which inversely displayed in the "Select Endpoint" display area. Entries for PVC connections in the list include a "State" display area indicating its active/inactive state on the network domain composed of the NEs 202, a "Type" display area indicating its type, a "Connection Name" display area indicating its proper name, and a "Schedule" display area indicating whether or not it has already been scheduled for use.

FIG. 5 shows the contents of the states set in the "State" display area and the "Schedule" display area. "Inactive" set in the "State" display area indicates the mentioned above inactive state and "Active" indicates the mentioned above active state. "Scheduled" set in the "Schedule" display area indicates the state in which a schedule has already been reserved and "non" indicates the state in which no schedule has been reserved yet.

The example of the display screen shown in FIG. 4 indicates that a PVC connection, called "Test1-VPC", which resides on a physical link, called "tESTLINK1", under NE 202 called "TestNE1" is in the inactive state ("Inactive") and its schedule has not been reserved yet ("non").

Figure 6:
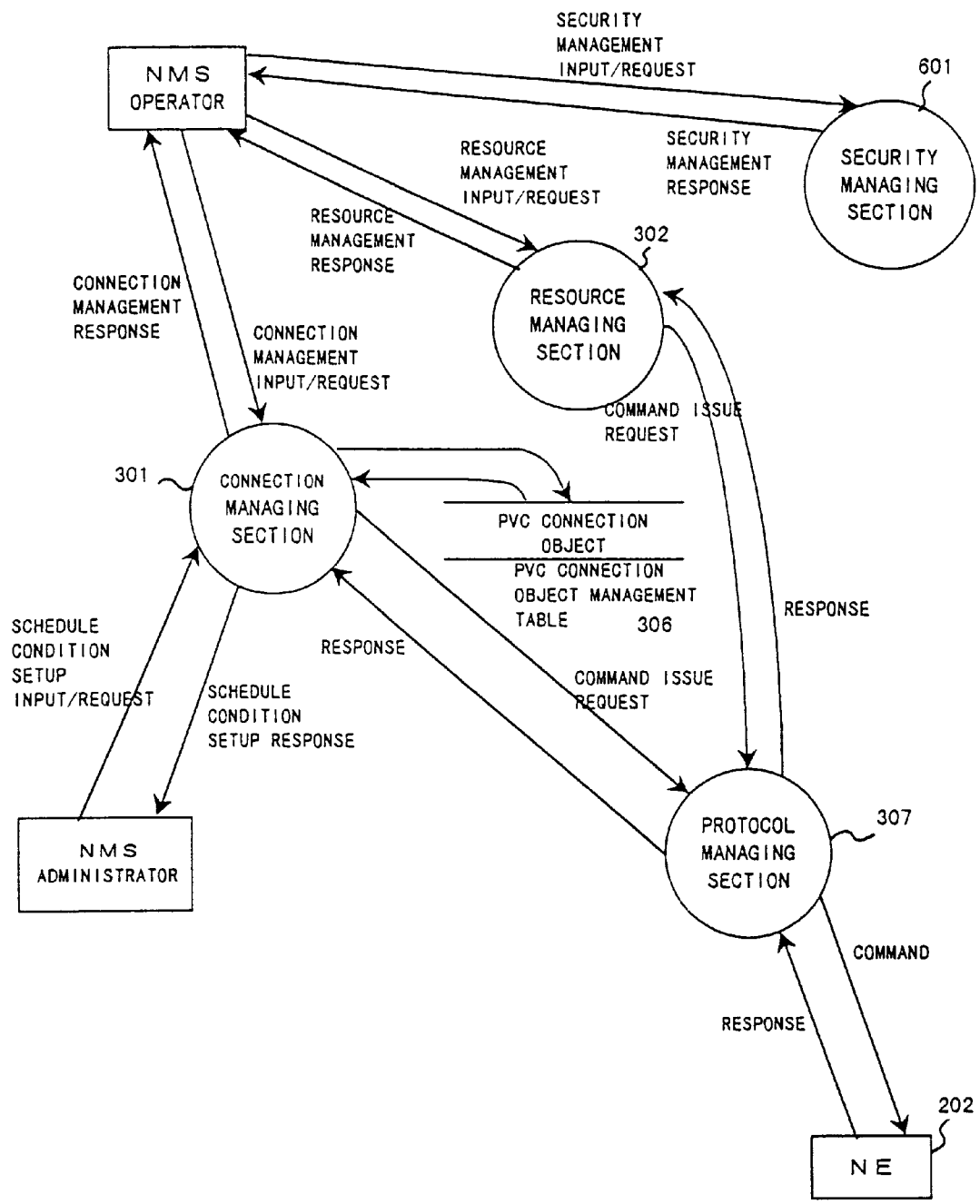
FIG. 6 shows an example of the flow of data in the PVC connection reservation control.

FIG. 6 shows an example of data flow among each component in the NMS server 201 shown in FIG. 3, an operator who operates the NMS server 201 from a local terminal 203 or remote terminal 204 of FIG. 2, an administrator who manages the NMS server 201 from a local 203 or remote terminal 204, and an NE 202.

A security managing section 601 (not shown in FIG. 3), the resource managing section 302 and the connection managing section 301 in the NMS server 201 receive an input/request for setting up a PVC connection, an input/request for controlling the state of a PVC connection and an input/request for controlling the schedule of a PVC connection, which are shown in FIG. 7, from the operator (NMS operator) who operates the NMS server 201 through a local terminal 203 or a remote terminal 204, and return a response for each of the inputs/requests.

The connection managing section 301 receives a PVC connection schedule condition setup input/request shown in FIG. 7 from the administrator (NMS administrator) who manages the NMS server 201 through a local terminal 203 or a remote terminal 204, and passes it to the reservation controlling section 305 shown in FIG. 3. In response to this, the reservation controlling section 305 returns a schedule condition setup response to the NMS administrator through the connection managing section 301. The NMS operator may also make an inquiry about check type or check level concerning schedule contention to be described later (refer to FIGS. 22 and 23), which is a part of schedule condition setup inputs/requests.

The connection managing section 301 or the resource managing section 302 directly requests the protocol managing section 307 (or requests the protocol managing section 307 through the resource managing section 302) to issue a command when need arises to make communications with the NEs 202. In response to the request to issue a command, the protocol managing section 307 issues a command to the NEs 202 and then returns responses from the NEs 202 to the connection managing section 301 or the resource managing section 302.

When a process of creating, changing or deleting a PVC connection or a process of activating or deactivating a PVC connection becomes necessary, particularly the connection managing section 301 makes communications with the NEs 202 via the protocol managing section 307 (or the resource managing section 302 and the protocol managing section 307) while performing a required read or write operation on the PVC connection object management table 306 (see FIG. 3).

Schedule Controlling Function

FIG. 8 shows a configuration of the reservation controlling section 305 of FIG. 3 for performing a schedule controlling function.

A time/duration setting section 801, operating when the scheduling of an object PVC connection corresponding to a PVC connection object defined in the PVC connection object management table 306 (FIG. 3) is specified by an operator who operates the NMS server 201 through the local terminal 203 or remote terminal 204 as shown in FIG. 2, the time/duration setting section 801 controls entry, the time at which a change in the state of the object PVC connection is to be started and the duration for which the state change is retained as the schedule data.

When periodic activation is requested in scheduling, a periodic activation setting section 802 operates to control the setting of periodic activation on a daily, weekly, or monthly basis, by way of example, and entry of data on an activation start time and duration.

The input schedule data are entered, for example, as a part of attributes of that PVC connection object in the PVC connection object management table 306 which corresponds to the object PVC connection. Alternatively, the input schedule data are entered into a PVC-VP/VC-time allocation table 1603 shown in FIG. 16 after being subjected to contention check processing to be described later.

The time/duration setting section 801 or the periodic activation setting section 802 issues object PVC connection identification data and time data to a time monitoring timer 803 on the basis of the input schedule data entered by the operator.

When a specified time indicated by one of time data mentioned above entered in the time monitoring timer 803 is reached by the current time, the timer sends the object PVC connection identification data and notification that a time-out has occurred to a PVC active/inactive state controlling section activating section 804.

Upon receipt of the time-out notification, the PVC active/inactive state controlling section activating section 804 makes a request to a PVC active/inactive state controlling section 304 in the connection managing section 301 for switching the state of the PVC connection corresponding to the identification data.

In response to this request, the active/inactive state controlling section 304 performs a process of issuing commands to the NEs 202 and a process of switching the active/inactive state of that PVC connection object in the PVC connection object management table 306 which corresponds to the object PVC connection.

Figure 9:
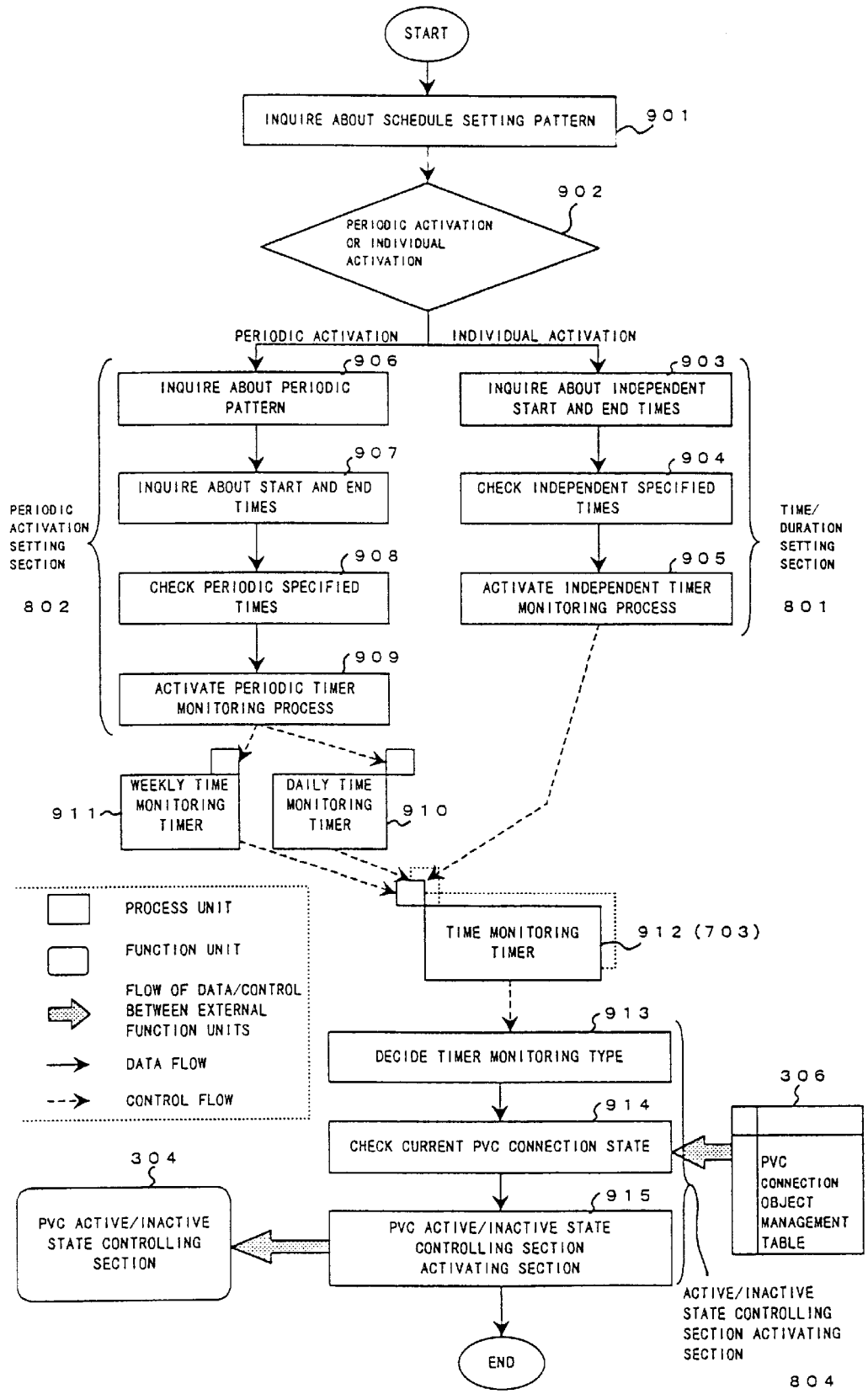
FIG. 9 is a flowchart for the operation of the reservation controlling section.

FIG. 9 is a flowchart for the control processing of the reservation controlling section 305 configured as shown in FIG. 8.

First, the reservation controlling section 305 performs schedule pattern inquiry processing to thereby inquire of the NMS operator which of periodic activation and individual activation he or she specifies (steps 901 and 902).

Figure 10:
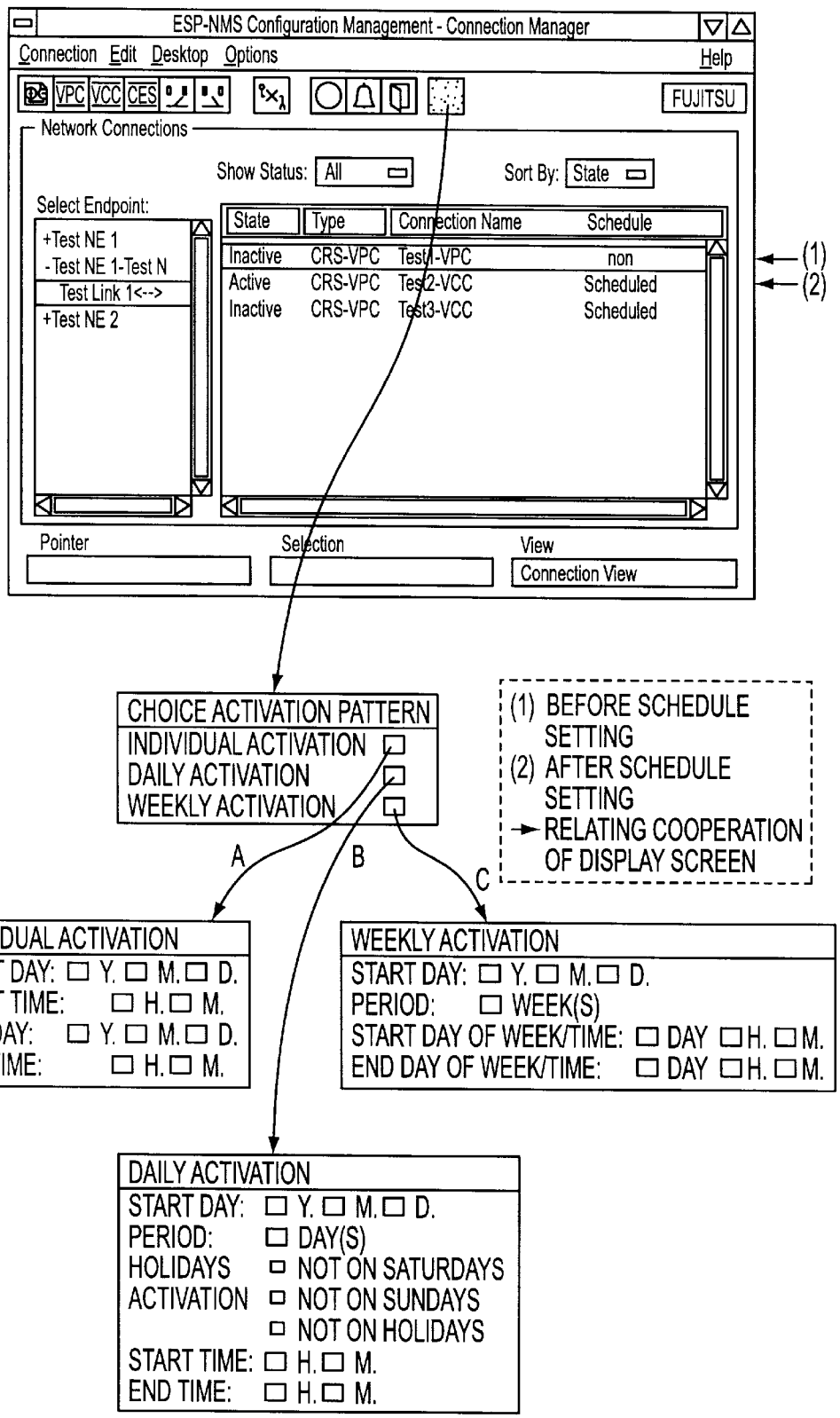
FIG. 10 shows a flow for a determination on the display screen in the PVC connection reservation control.

When specifying individual activation, the NMS operator specifies the individual activation as indicated at A in FIG. 10 on the on-screen window for PVC connection reservation control shown in FIG. 4.

When the NMS operator specifies the individual activation in this manner, the time/duration setting section 801 inquires of the NMS operator about independent start and end times (step 903). As a result, a check is made as to whether or not the specified times by the NMS operator are correct (step 904) and then the process of the time monitoring timer 803 is started by independent timer monitoring process activation processing (steps 905 to 912).

On the other hand, when specifying periodic activation, the NMS operator specifies the daily or weekly activation as indicated at B or C in FIG. 10 on the on-screen window for PVC connection reservation control shown in FIG. 4.

When the NMS operator specifies the periodic activation in this manner, the periodic activation setting section 802 inquires of the NMS operator about periodic start and end times (step 907). As a result, a check is made as to whether or not the specified times by the NMS operator are correct (step 908) and then a daily time monitoring timer process and a weekly time monitoring timer process are started by periodic timer monitoring process activation processing (steps 909, 910 and 911).

The daily time monitoring timer process and the weekly time monitoring timer process activate the time monitoring timer 803 once a day and once a week, respectively, to implement time-out processing at a specified hour or on a specified day of the week (steps 910 to 911, 911 to 912).

As described previously, when one of time data mentioned above entered in the time monitoring timer 803 is reached by the current time, the timer presents identification data for the object PVC connection and time-out notification to the PVC active/inactive state controlling section activating section 804.

Upon receipt of the time-out notification, the PVC active/inactive state controlling section activating section 804 first decides the timer monitoring type (step 913) and then refers to the PVC connection object management table 306 to check the current state of the PVC connection for legality (step 914). If the result indicates legality, then the PVC active/inactive state controlling section activating section 804 issues a request to the PVC active/inactive state controlling section 304 for switching the state of the PVC connection corresponding to the identification data sent together with the time-out notification (step 915).

Contention Checking Function (First Function)

Figure 11:
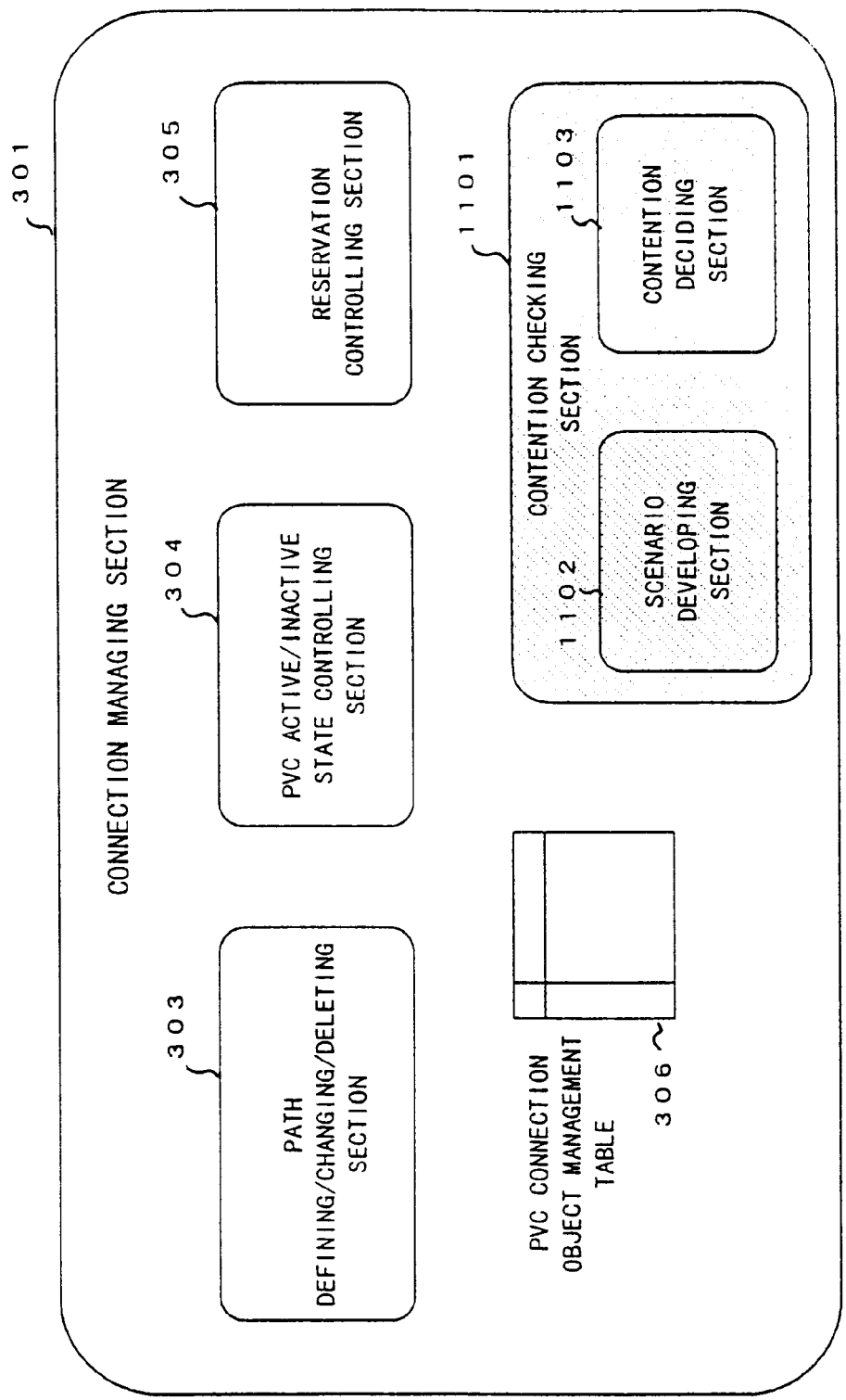
FIG. 11 shows a configuration (No. 1) of a contention checking section.

FIG. 11 shows a configuration for implementing the contention checking function (first function) at the time of reservation control by the reservation controlling section 305.

In this contention checking function, at the time of checking contention for a schedule of an object PVC connection, each NE 202 will receive inquiries for the usage of the resources of each NE 202 which are used by the object PVC connection, thereby allowing the presence or absence of contention for the scheduled object PVC connection to be checked.

Figure 12:
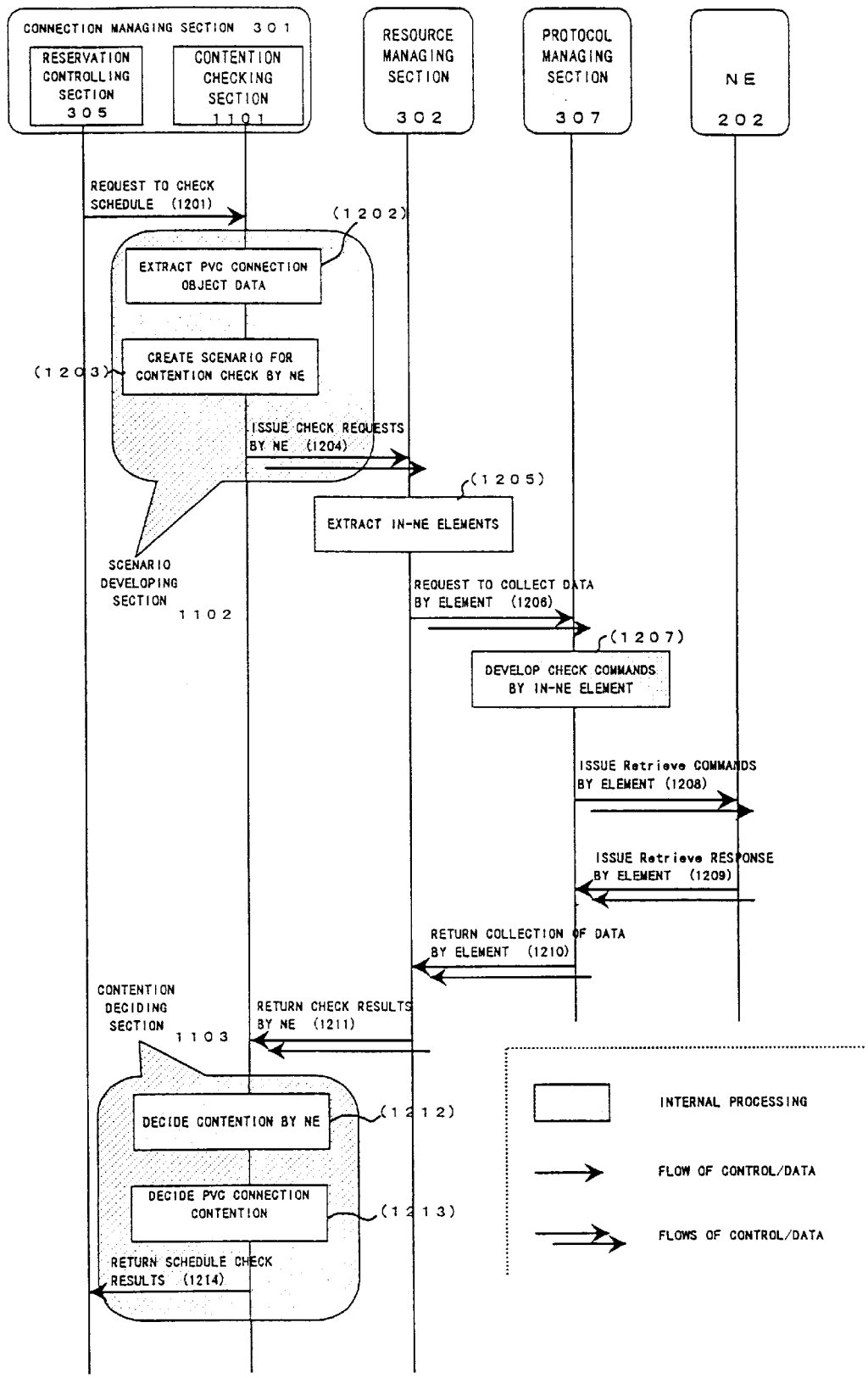
FIG. 12 shows an operational sequence of the contention checking process (No. 1)

In FIG. 11, the connection managing section 301 (see FIG. 3) is installed with a contention checking section 1101. Hereinafter, a contention checking process by the contention checking section 1101 will be described on the basis of the operational sequence shown in FIG. 12.

When a schedule contention check (see FIG. 7) is specified by the operator who operates the NMS server 201 through the local terminal 203 or remote terminal 204 as shown in FIG. 2 for a given object PVC connection, the reservation controlling section 305 makes a request to the contention checking section 1101 for checking schedule contention for that object PVC connection (step 1201).

Upon receipt of this request, the contention checking section 1101 activates a scenario developing section 1102. The scenario developing section 1102 first extracts PVC connection object data corresponding to the object PVC connection in the PVC connection object management table 306 to thereby obtain the elements of the object PVC connection, such as types and bandwidths of lines and communications units of the NEs 202 that the object PVC connection passes, VPs/VCs that the NEs 202 allocate, etc. (step 1202).

The scenario developing section 1102 next creates a scenario for contention checking for each of the NEs 202 on the basis of the extracted elements forming the object PVC connection (step 1203) and issues check requests for each NE 202 to the resource managing section 302 (FIG. 3) on the basis of the created scenarios (step 1204).

Based on the received NE check requests, the resource managing section 302 extracts specific elements (resources: office elements (OEs), VPs, VCs, etc.) that the object PVC connection will use in each NE 202 and issues a request for collecting data by elements for each NE 202 and each element to collect data on each of the extracted elements from each NE 202 for return to the protocol managing section 307 (step 1206).

The protocol managing section 307 creates Retrieve commands by element which are commands to the NEs 202 in response to the received request for collecting the data by elements for each NE 202 and each element (step 1207) and issues them to the NEs 202 via the IP network 205 (FIG. 2) (step 1208).

As a result, each NE 202 returns Retrieve responses by elements, each of which corresponds to a respective one of the Retrieve commands by elements to the protocol managing section 307 (step 1209).

The protocol managing section 307 creates the collections of data by elements for each NE 202 and each element which correspond to the received Retrieve responses by elements and returns them to the resource managing section 302 (1210).

Upon receipt of the collections of data by elements corresponding to all the requests made by the resource managing section 302 for collecting data by element for each NE 202, the resource managing section 302 returns them as the check results by NEs 202 to a contention deciding section 1102 in the contention checking section 1101 (step 1111).

Based on the check results by NEs 202, the contention deciding section 1102 makes a decision for each NE 202 as to whether or not contention occurs for each of elements that the object PVC connection uses in the NE 202 (step 1112).

The contention deciding section 1102 accumulates the results in step 1112 for all the NEs 202 and returns the accumulation to the reservation controlling section 305 as the result of the schedule check (step 1114).

By the above control processing, each NE 202 is directly inquired of as to the usage of each element comprising the scheduled PVC connection, thereby allowing the presence or absence of contention for the scheduled PVC connection to be checked in real time.

Contention Checking Function (Second Function)

Figure 13:
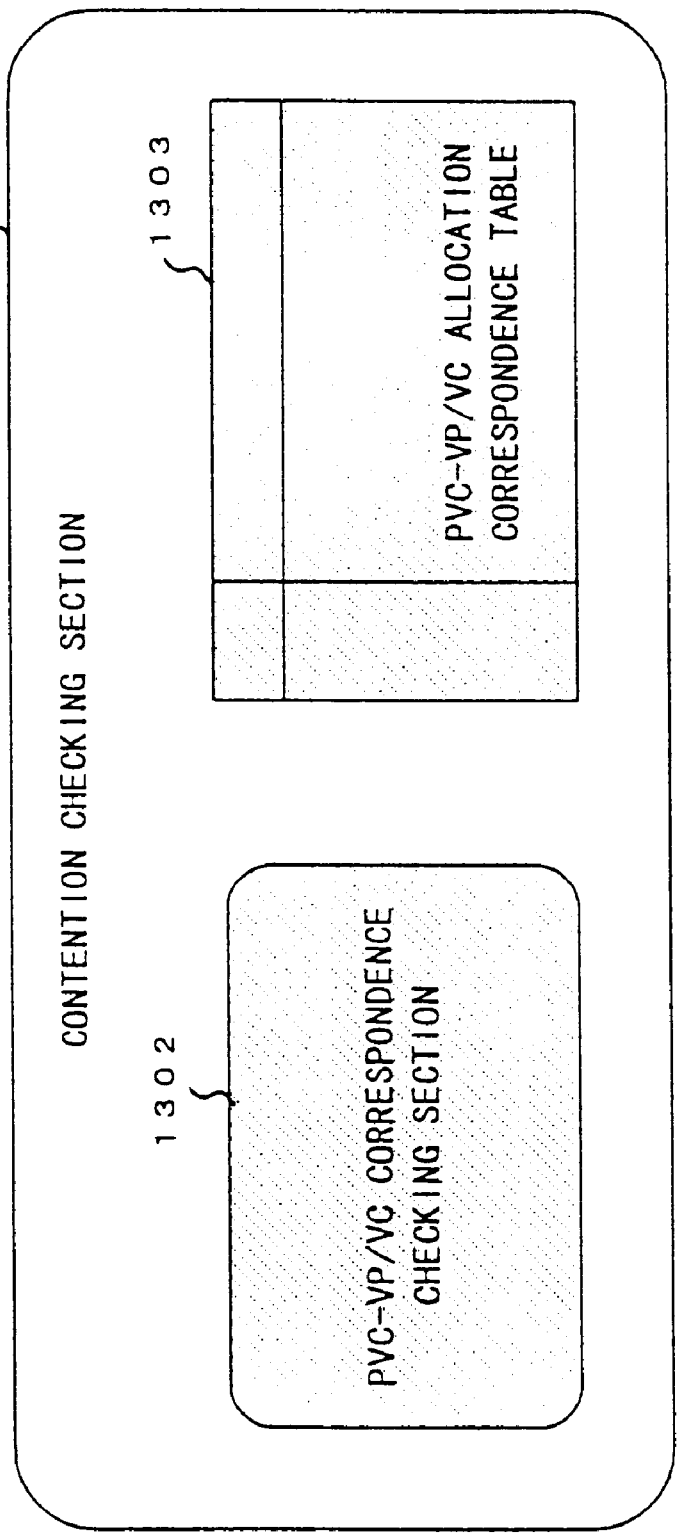
FIG. 13 shows a configuration (No. 2) of the contention checking section.

FIG. 13 shows a configuration for implementing a second contention checking function at the time of reservation control by the reservation controlling section 305.

With the second contention checking function, the connection managing section 301 (see FIG. 3) is installed with a contention checking section 1301 which has a PVC-VP/VC allocation table 1303 that, for each PVC connection, indicates VP/VC that it will use in each NE 202 as a pointer to the resource managing section 302 (see FIG. 3). At the time of checking contention for schedule of an object PVC connection, a PVC-VP/VC correspondence checking section 1302 in the contention checking section 1301 refers to the PVC-VP/VC allocation table 1303 to check whether the object PVC connection contends for VP/VC that it will use with PVC connections which have been scheduled and checked for contention.

When a PVC connection is defined in the path defining/changing/deleting section 303 in the connection managing section 301 shown in FIG. 3, data on the defined PVC connection is entered into the PVC connection object management table 306 in the connection managing section 301 and moreover into the PVC-VP/VC allocation table 1303 in the contention checking section 1301 of FIG. 13.

Figure 14:
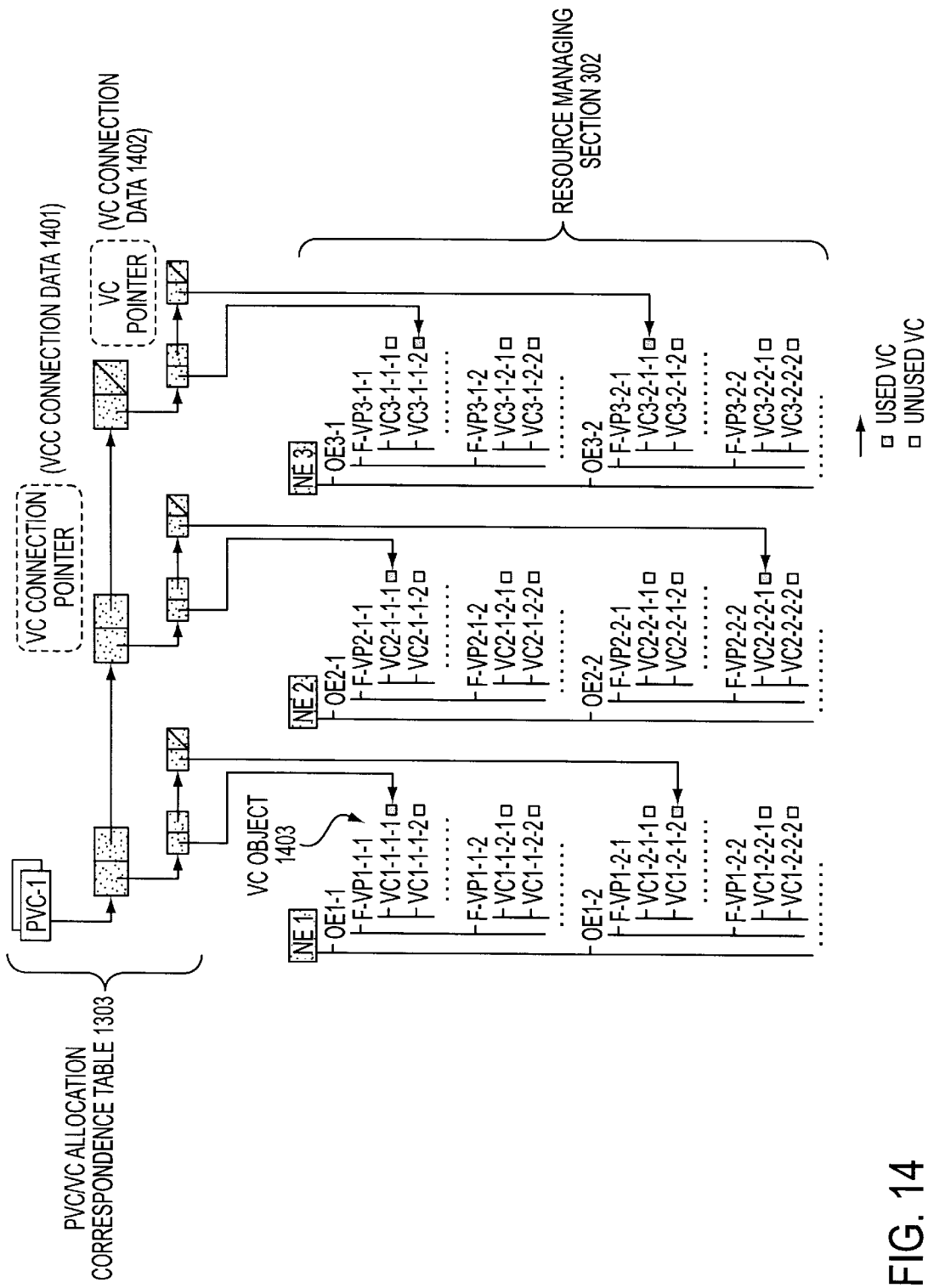
FIG. 14 shows an example of configurations of the PVC-VP/VC allocation correspondence table and the resource managing section.

FIG. 14 shows a configuration of the PVC-VP/VC allocation table 1303 combined with a configuration of the resource managing section 302 (FIG. 3). In this example, the PVC connection is assumed to be a virtual channel connection (VCC). Of course, the PVC connection may be a virtual path connection (VPC), in which case VC in the following description has only to be replaced with VP.

In the PVC-VP/VC allocation table 1303, a VCC (PVC connection) is defined by VCC connection data 1401 and VC connection data 1402. The VCC connection data 1401 is a chain of pointer sets each consisting of a pointer to a VC connection defined in each NE 202 and a pointer indicating a connection relationship between each NE 202. The VC connection data 1402 is a collection of pointer sets each consisting of a pointer to a VC object 1403 in the resource managing section 302, which is pointed to by a VCC connection pointer in the VCC connection data 1401, and a pointer indicating a connection relationship between each VC object 1403.

Figure 15:
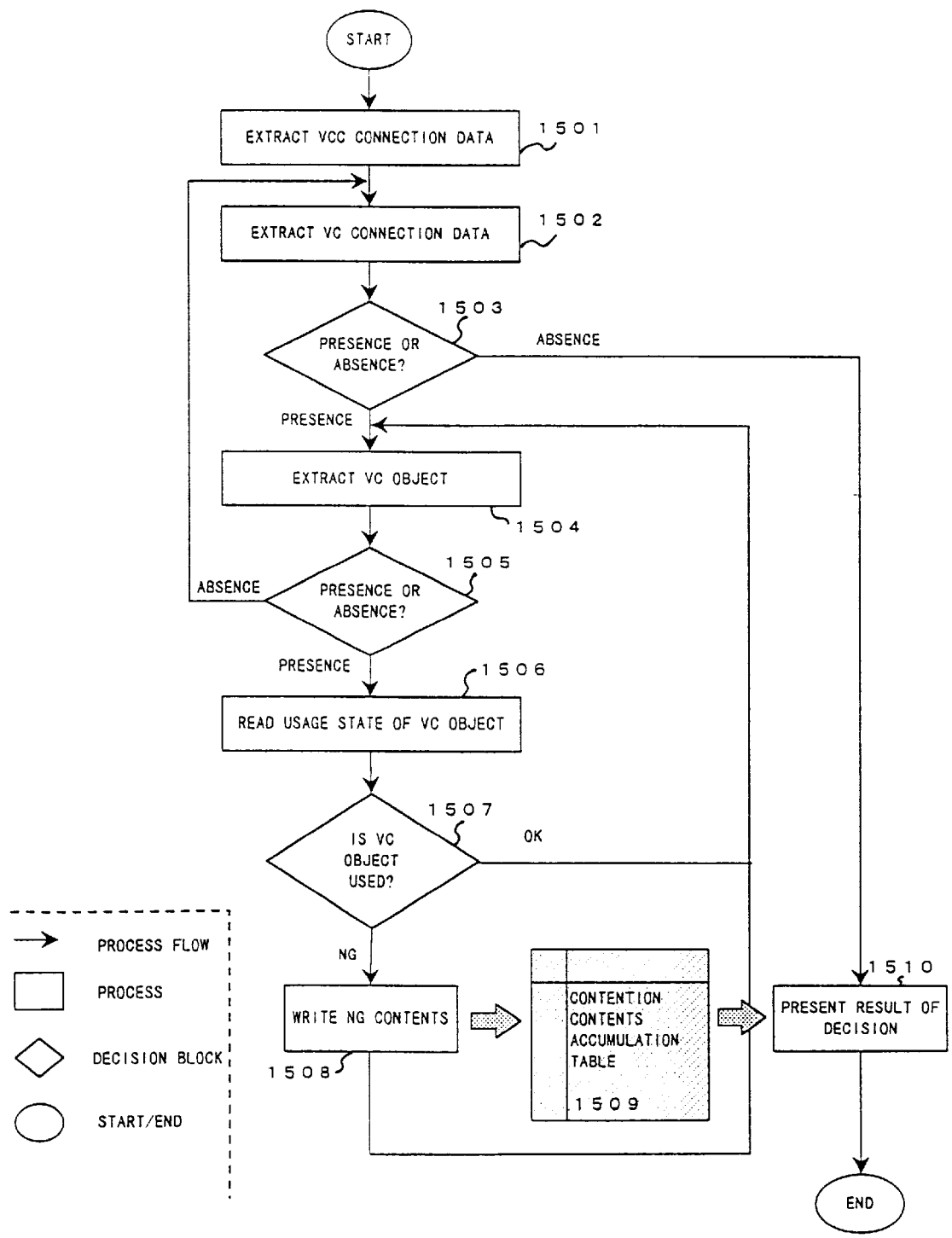
FIG. 15 is an operational flowchart for the contention checking process (No. 2)

FIG. 15 is a flowchart for contention check processing (second function) performed by the PVC-VP/VC correspondence checking section 1302.

First, the reservation controlling section 305 shown in FIG. 3 activates the PVC-VP/VC correspondence checking section 1302 when a schedule contention check (see FIG. 7) is specified by the operator who operates the NMS server 201 through the local terminal 203 or remote terminal 204 as shown in FIG. 2 for a predetermined object VCC (PVC connection).

The PVC-VP/VC correspondence checking section 1302 first extracts the VCC connection data 1401 corresponding to the object VCC from the PVC-VP/VC allocation table 1303 (step 1501).

The PVC-VP/VC correspondence checking section 1302 next makes an attempt to extract a pointer set from the beginning of the VCC connection data 1401 (steps 1502 and 1503).

When the pointer set is extracted, the PVC-VP/VC correspondence checking section 1302 makes a further attempt to extract from the resource managing section 302 a VC object 1403 that is further pointed to by a pointer in the VC connection data 1402 that is pointed to by a pointer in the extracted pointer set (steps 1503, 1504, and 1505).

When, as a result, one VC object 1403 is extracted in the resource managing section 302, the PVC-VP/VC correspondence checking section 1302 reads in the usage of the VC object 1403 which set for the VC object 1043 in the resource managing section 302 (step 1506) and then checks its state (step 1507).

When the result is that the extracted VC object 1403 is not yet used by any other VCC (PVC connection) (OK in step 1507), the PVC-VP/VC allocation checking section 1302 further follows other VC connection data 1402 using another pointer in the VC connection data 1402 pointed to by a pointer in the current VCC connection data 1401 and makes an attempt to extract a VC object 1403 in the resource managing section 302 that is pointed to by that pointer in the VC connection data 1402 (steps 1507, 1504 and 1505). Based on the result of the extraction step, the usage of the VCC object 1403 is checked in the same manner as described above.

If, on the other hand, the decision is NG, i.e., the extracted VC object 1403 has already been used by another VCC (PVC connection), then the PVC-VP/VC correspondence checking section 1302 writes NG contents indicating the VC object 1403 has already been used into a contention contents accumulation table 1509 (step 1508). After that, the PVC-VP/VC correspondence checking section 1302 makes an attempt to extract a new VC object 1403 in the resource managing section 302 in the same manner as described above (steps 1507, 1504 and 1505) and then makes a decision as to the usage of the extracted VC object 1403 as described above.

In this manner, the PVC-VP/VC correspondence checking section 1302 examines the usage of one VC connection that is established in one NE 202 by its two VCs.

When one pointer in a pointer set in the current VCC connection data 1401 fails to extract a VC object 1403, the PVC-VP/VC correspondence checking section 1302 makes an attempt to extract another pointer set in the VCC connection data 1401 that is pointed to by the other pointer in that pointer set in the current VCC connection data 1401 (steps 1505, 1502 and 1503).

When a new pointer set is extracted as the result, the PVC-VP/VC correspondence checking section 1302 extracts the same VC connection data 1402 as described above on the basis of a pointer in the extracted pointer set, then extracts that VC object 1403 in the resource managing section 302 which belongs to it and examines the usage, in the same manner as described above. The extracting process and examining process are repeated.

In this manner, the PVC-VP/VC correspondence checking section 1302 can check each of VC connections, each established by two VCs in a respective NE 202 that correspond to an object VCC, for usage.

If, when all the pointer sets have been extracted from the VCC connection data 1401, NG information indicating that any one or more of VC objects 1403 has been used has been written into the contention contents accumulation table 1509, then the PVC-VP/VC correspondence checking section 1302 returns the information to the NMS operator via the reservation controlling section 305 (FIG. 3) to thereby prompt him or her to reorganize or cancel the schedule. Otherwise, the PVC-VP/VC correspondence checking section 1302 returns information indicating the absence of contention to the NMS operator via the reservation controlling section 305 (FIG. 3) and, at the same time, sets all the checked VC objects 1403 in the resource managing section 302 to the used state (steps 1503 and 1510).

The above control processing allows the contention conditions of elements of a scheduled PVC connection to be checked on the basis of VP/VC held in the resource managing section 302 in the NMS server 201. This eliminates the need of sending commands to the NEs 202 and receiving responses therefrom, ensuring fast contention check processing.

Contention Checking Function (Third Function)

Figure 16:
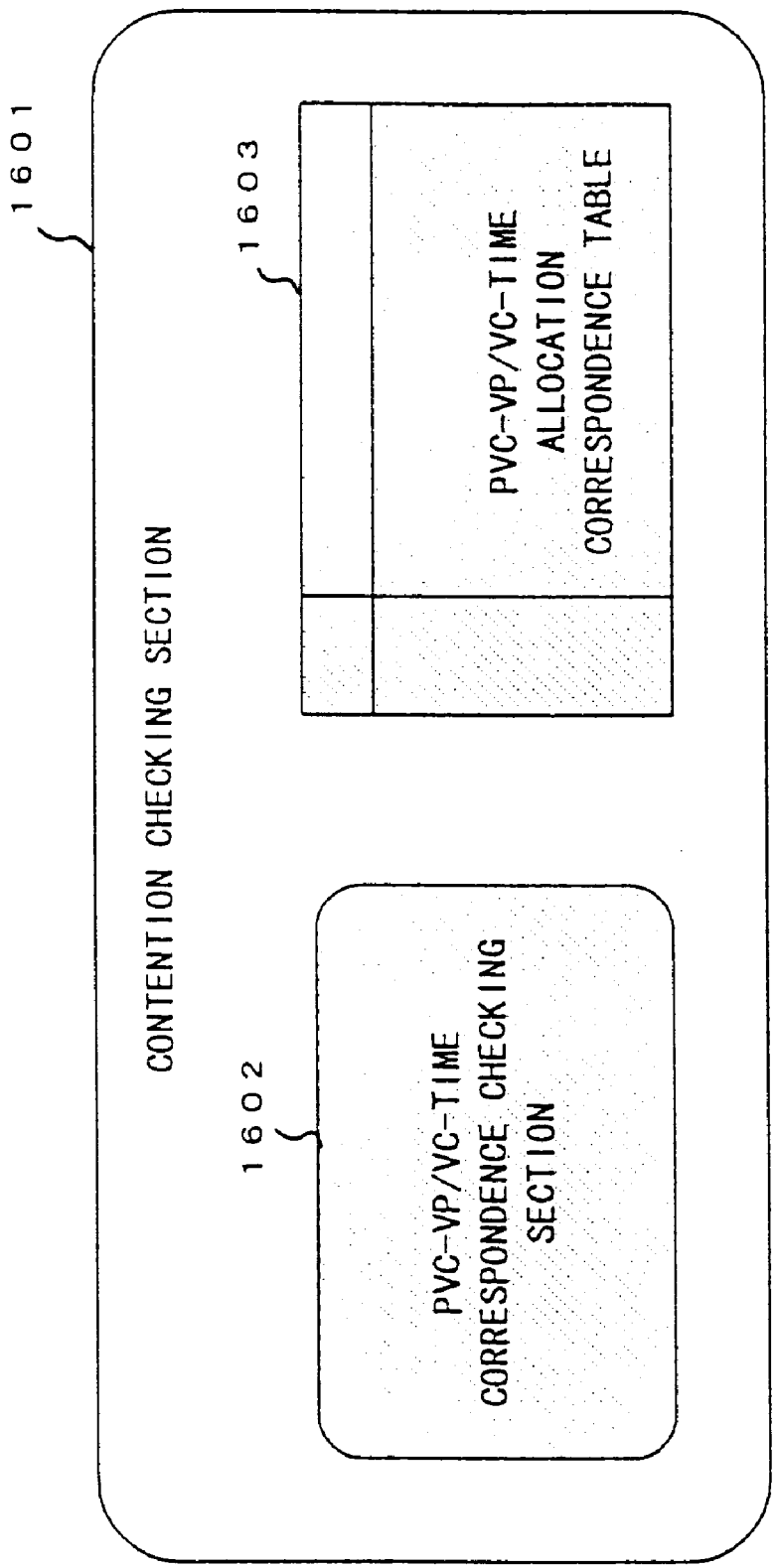
FIG. 16 shows a configuration (No. 3) of the contention checking section.

FIG. 16 shows a configuration for implementing a third contention checking function at the time of reservation control by the reservation controlling section 305.

The third contention checking function supposes the second contention checking function. Thus, a contention checking section 1601 shown in FIG. 16 involves the configuration of FIG. 13, though not shown in detail beside of the configuration shown in FIG. 16. In this case, a PVC-VP/VC-time correspondence checking section 1602 as shown in FIG. 16 involves the function of the PVC-VP/VC correspondence checking section 1302 of FIG. 13, and a PVC-VP/VC-time allocation correspondence table 1603 as shown in FIG. 16 is provided besides the PVC-VP/VC allocation table 1303 of FIG. 13.

The feature of the third contention checking function is that the PVC-VP/VC-time correspondence checking section 1602 first performs the contention check processing in steps 1701 to 1707 of FIG. 17 which are the same steps of 1501 to 1507 of FIG. 15 and, upon knowing that, in the resource managing section 302, any one of VC objects 1403 that an object VCC (object PVC connection) uses has already been used by another VCC, next refers to the PVC-VP/VC-time allocation correspondence table 1603 for that VC object 1403, thereby making VC contention decision by hour (step 1708 in FIG. 17).

Figure 18:
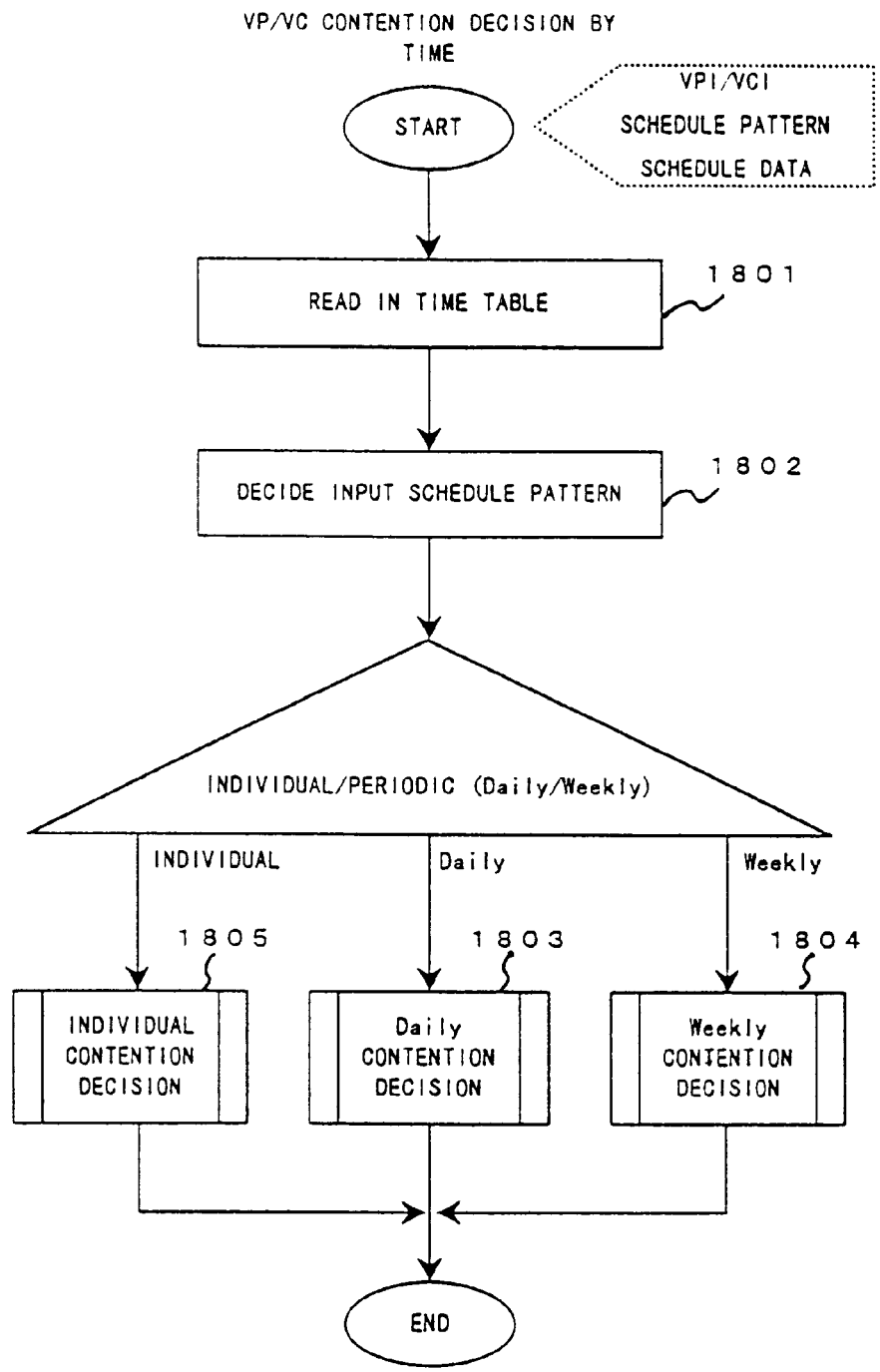
FIG. 18 shows an operational flowchart (No. 2) for the contention checking process (No. 3)

The VC contention decision by hour in step 1708 of FIG. 17 is illustrated by a flowchart of FIG. 18.

To make VC contention decision by hour, the PVC-VP/VC-time correspondence checking section 1602 receives from the PVC-VP/VC correspondence checking section 1302 of FIG. 13 a VCI (Virtual Channel Identifier) or VPI (Virtual Path Identifier) corresponding to a VC or VP for which contention has been detected, and from the reservation controlling section 305 of FIG. 3 it receives a schedule pattern indicating individually specified activation or periodic activation (on a daily or weekly basis) and actual schedule data.

The PVC-VP/VC-time correspondence checking section 1602 first reads in the PVC-VP/VC-time allocation correspondence table 1603 (step 1801) and then makes a decision of whether or not the schedule pattern indicates individually specified activation or periodic activation (daily/weekly) (step S1802). According to the result of the decision, any one of processes of daily contention decision (step 1803), weekly contention decision (step 1804), and individual contention decision (step 1805) is activated.

The daily contention decision process, which, of the three contention decision processes, is the most basic, will be described with reference to the flowchart shown in FIG. 19.

Figure 19:
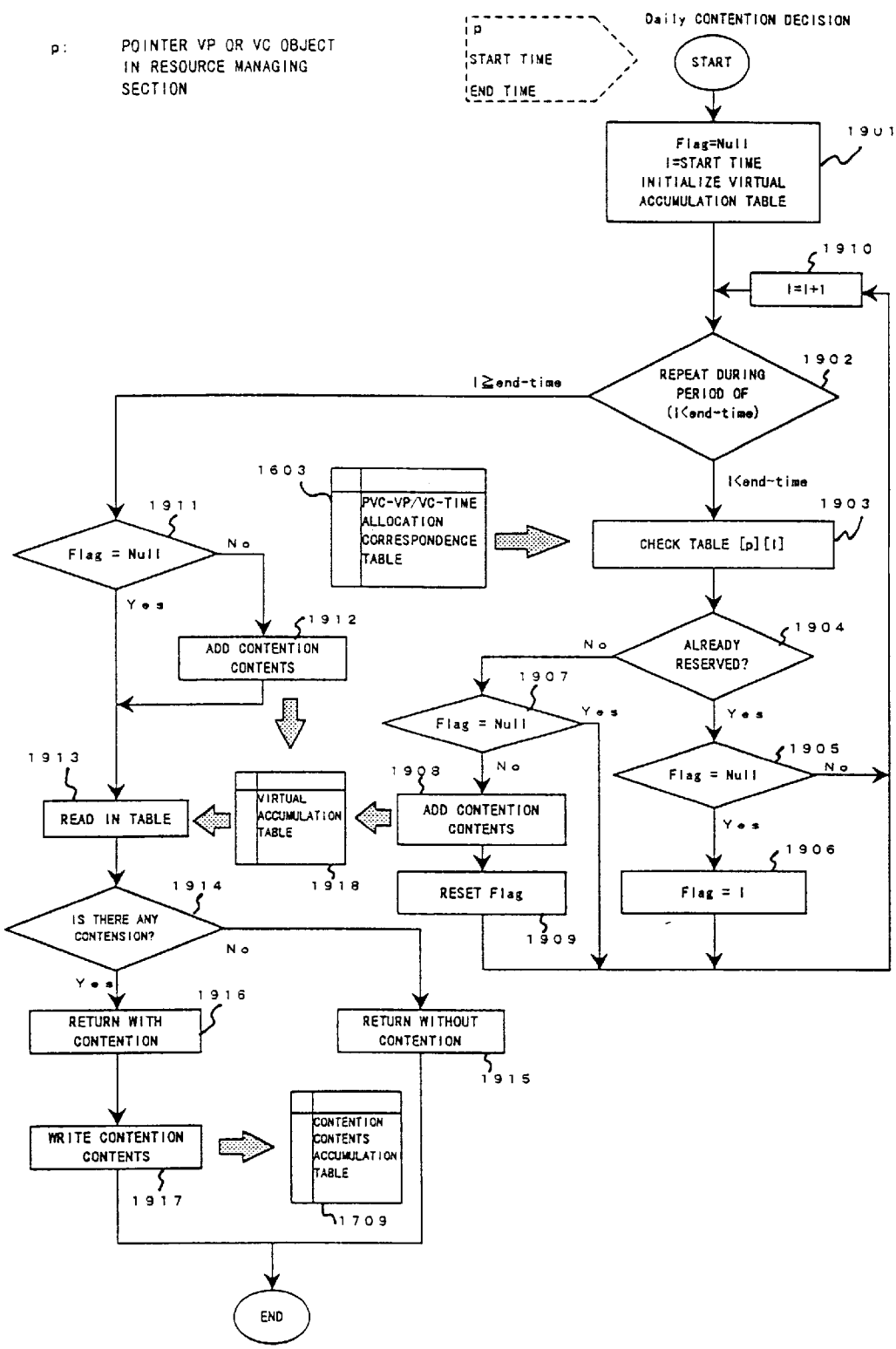
FIG. 19 shows an operational flowchart (No. 3) for the contention checking process (No. 3)

The PVC-VP/VC-time correspondence checking section 1602 activates the processing indicated by the flowchart of FIG. 19 using as arguments the pointer p to a VC object 1403 (see FIG. 14) in the resource managing section 302 for which contention has been detected and the start and end times which are schedule data for a VCC to be checked for contention. Hereinafter, each step in the flowchart of FIG. 19 is carried out by the PVC-VP/VC-time correspondence checking section 1602.

First, a local variable, Flag, is initialized to null, a local variable, I, is set to the start time, and the contents of a virtual accumulation table 1918 to be described later are initialized (step 1901).

Next, steps 1902 to 1910 are repeated until it is decided in step 1902 that the variable I has reached the end time while the variable I is incremented by 1 in step 1910.

That is, the PVC-VP/VC-time allocation correspondence table 1603 is referenced using the pointer p to the VC object 1403 (see FIG. 14) in the resource managing section 302 for which contention has been detected and the value of the variable I as arguments (step 1903).

Figure 20:
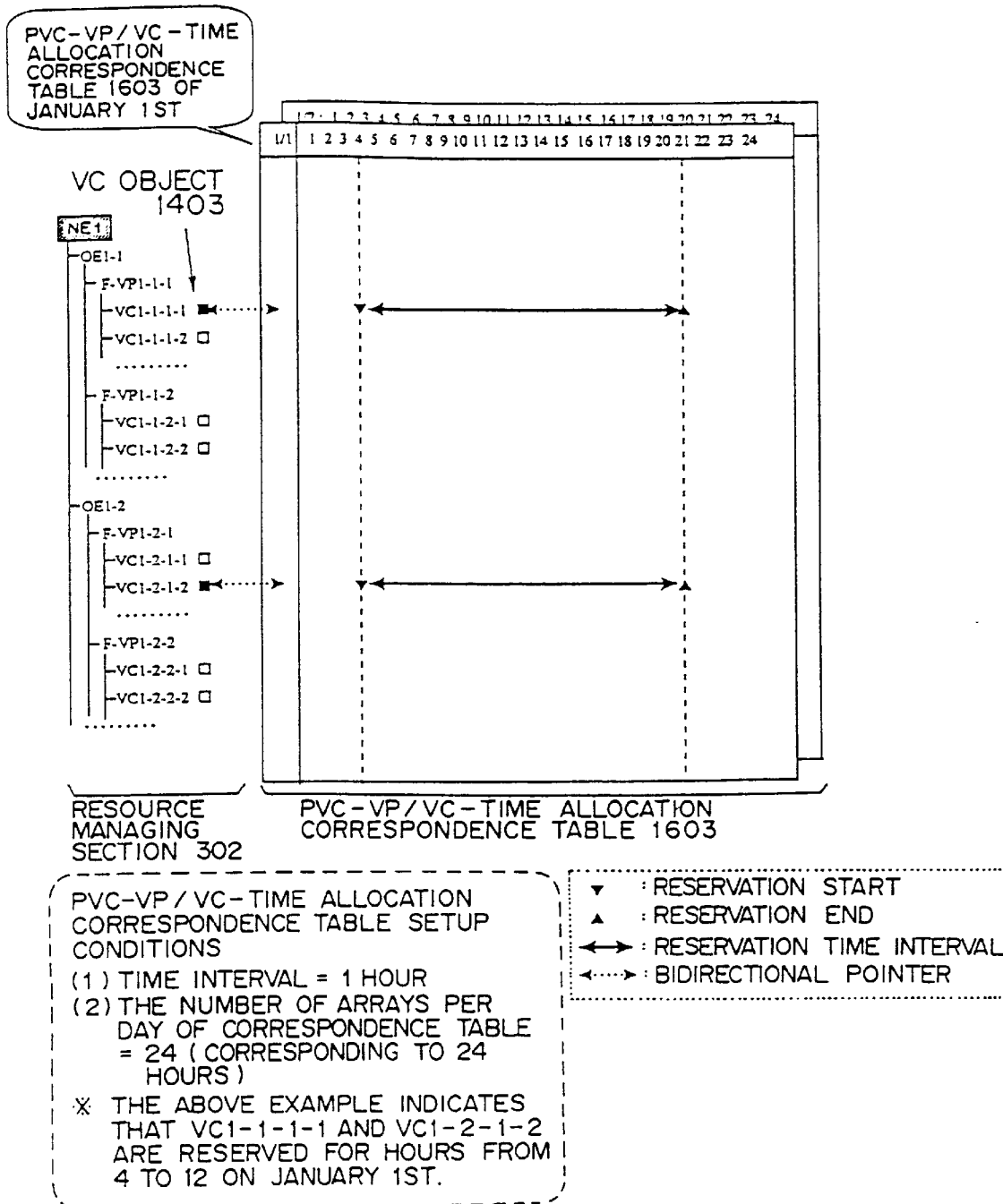
FIG. 20 shows an example of configurations of the PVC-VP/VC-time allocation correspondence table and the resource managing section.

FIG. 20 shows an example of a configuration of the PVC-VP/VC-time allocation correspondence table 1603 in combination with the resource managing section 302 (FIG. 3). In this example, PVC connection is assumed to be VCC. Of course, PVC connection may be assumed to be VPC, in which case VC in the following description needs only to be replaced with VP.

As shown in FIG. 20, the PVC-VP/VC-time allocation correspondence table 1603 comprises an array of 24 elements corresponding to 24 hours for each day and for each VC object 1403 which has been scheduled, and a value indicating "used" is placed in array elements corresponding to hours when the VC object 1403 is used. This array is linked by its pointer to the VC object 1403 in the resource managing section 302.

In step 1903, a decision is made as to whether or not the value indicating "used" has been placed in an array element corresponding to the value of the variable I on the array data corresponding to the pointer p in the PVC-VP/VC-time allocation correspondence table 1603. This allows detection of whether or not the object VCC and other VCCs are in contention on a time basis for the VC object 1403 for which contention has been detected.

If, when no reservation has been set yet at an hour corresponding to the value of the variable I as the result of the table checking in step 1903, and the variable Flag is null, the variable I is incremented by one to carry out the checking process on the next hour (steps 1904, 1907, 1910, 1902, and 1903).

If, on the other hand, the decision in step 1903 is that a reservation has already been set at the hour corresponding to the value of the variable I, the variable Flag is set to the value of the variable I (steps 1904, 1905 and 1906).

If, after that, the already-reserved state continues for some time as the time progresses while the variable I is incremented, a series of steps 1904, 1905 and 1910 is repeated, during which time the variable Flag retains time information at the time when a change was made from the unreserved state to the already-reserved state.

When an unreserved state is detected again as the time progresses while the variable I is incremented, a series of steps 1904, 1907 and 1908 are carried out with the result that information indicating the occurrence of contention for the VC object 1403 indicated by the pointer p from the hour indicated by the variable Flag to the hour indicated by the variable I, is placed in the virtual accumulation table 1918 in the step 1908.

After that, the variable Flag is reset to null (step 1909) and the variable I is incremented to restart the checking process for the next hour (steps 1909, 1910, 1902, and 1903).

When the variable I reaches the value indicating the end time as the result of repetition of the above series of operations, the following processing is carried out.

That is, when contention has occurred until immediately before and the variable Flag has been set to a value other than null, information indicating that contention for the VC object 1403 indicated by the pointer p has occurred from the hour indicated by the variable Flag to the end time indicated by the variable I, is placed in the virtual accumulation table 1918 (steps 1911 and 1912).

If no contention has occurred until immediately before and the variable Flag has been set to null, then step 1912 will not be carried out.

After that, the contents of the virtual accumulation table 1918 are read in (step 1913). If no contention is detected, then control is returned from the subroutine as shown in operational flowchart of FIG. 19 to the subroutine as shown in operational flowchart of FIG. 18, and further to the subroutine indicated by step 1708 of FIG. 17, accompanied by a return value indicating the absence of contention.

In this case, the PVC-VP/VC-time correspondence checking section 1602 returns to step 1704 of FIG. 17, which is the same as step 1504 of FIG. 15, to extract the VC object 1403 and then examine its usage (steps 1704 and 1708).

If, on the other hand, any contention is detected in the virtual accumulation table 1918, the contents of the contention for the current VC object 1403 (the date and time of contention) are written into the contention contents accumulation table 1709 (step 1917 of FIG. 19) and then control is returned from the subroutine as shown in operational flowchart of FIG. 19 to the subroutine as shown in operational flowchart of FIG. 18, and further to the subroutine indicated by step 1708 of FIG. 17, accompanied by a return value indicating the presence of contention.

After that, the PVC-VP/VC-time correspondence checking section 1602 returns to step 1704 of FIG. 17, which is the same as step 1504 of FIG. 15, to extract the VC object 1403 and then examine its usage (steps 1704 and 1708).

When all the pointer sets have been extracted from the VCC connection data 1401 (see FIG. 14) and contention for any one of the VC objects 1403 has been written in the contention contents accumulation table 1709, the PVC-VP/VC-time correspondence checking section 1602 returns the information about the contention to the NMS operator via the reservation controlling section 305 (FIG. 3) to prompt him or her to reorganize or cancel the schedule. Otherwise, the PVC-VP/VC-time correspondence checking section 1602 returns information indicating the absence of contention to the NMS operator via the reservation controlling section 305 (FIG. 3) and, at the same time, sets all the VC objects 1403 in the resource managing section 302 which have been checked to the used state, and sets schedule data for the object VCC in the PVC-VP/VC-time allocation correspondence table 1603 (steps 1703 and 1710).

The above control processing is the one (step 1803 of FIG. 18) which is performed when the daily periodic activation is specified. When the weekly periodic activation or the individual activation is specified, each activation day and the start time and end time in each activation day can be identified from the specified information shown in FIG. 10. Thus, the PVC-VP/VC-time correspondence checking section 1602 simply calculates each activation day and the start and end times in each activation day from the schedule data in the weekly contention checking process (step 1804) and the individual contention checking process (step 1805) shown in FIG. 18, and activates the daily contention check process shown in FIG. 19 for each activation day.

The above control processing allows PVC connections to be switched by time, which provides efficient utilization of band resources at highly-used line interfaces.

Contention Checking Function (Fourth Function)

Figure 21:
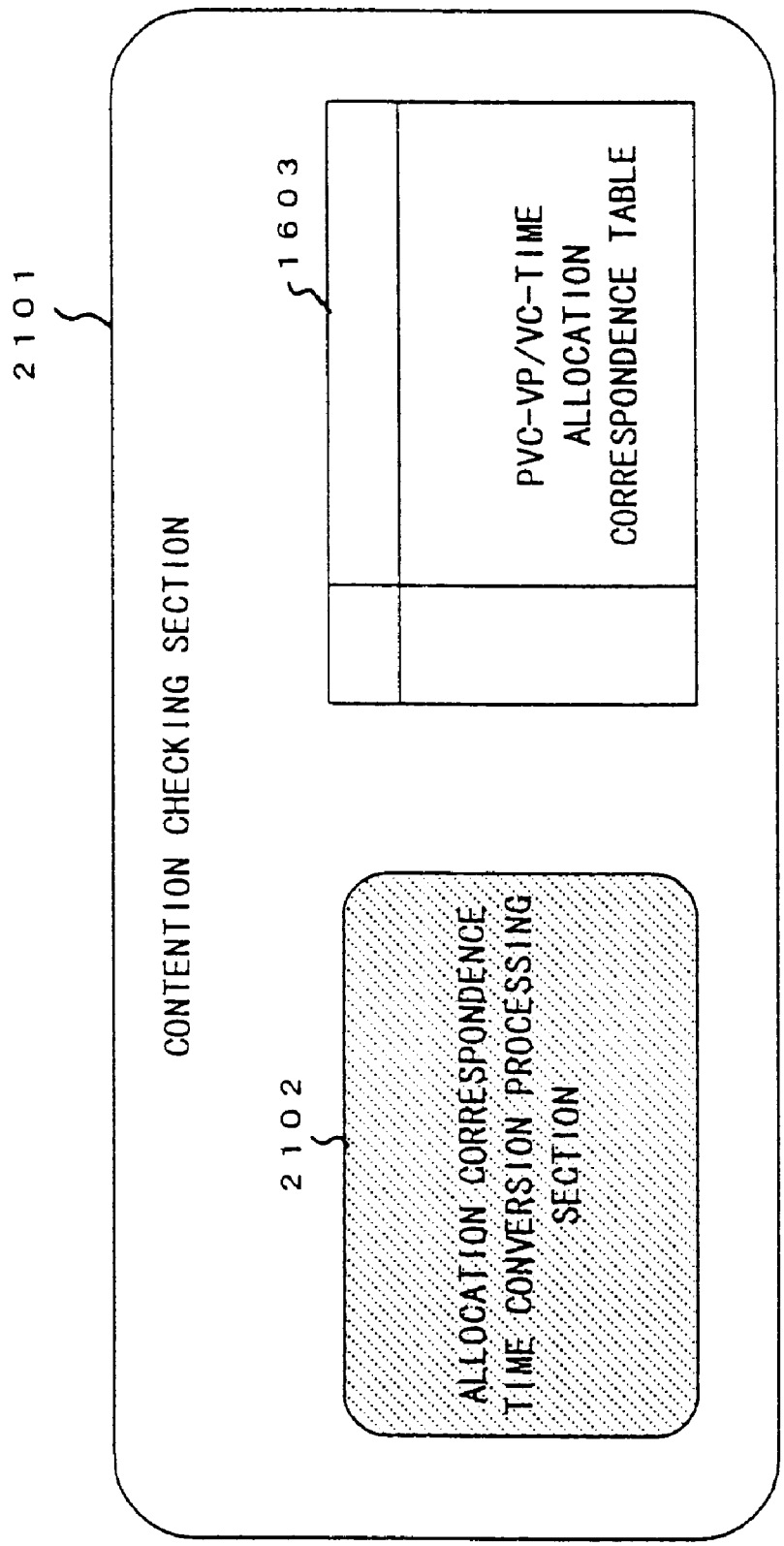
FIG. 21 shows a configuration (No. 4) of the contention checking section.
Figure 22:
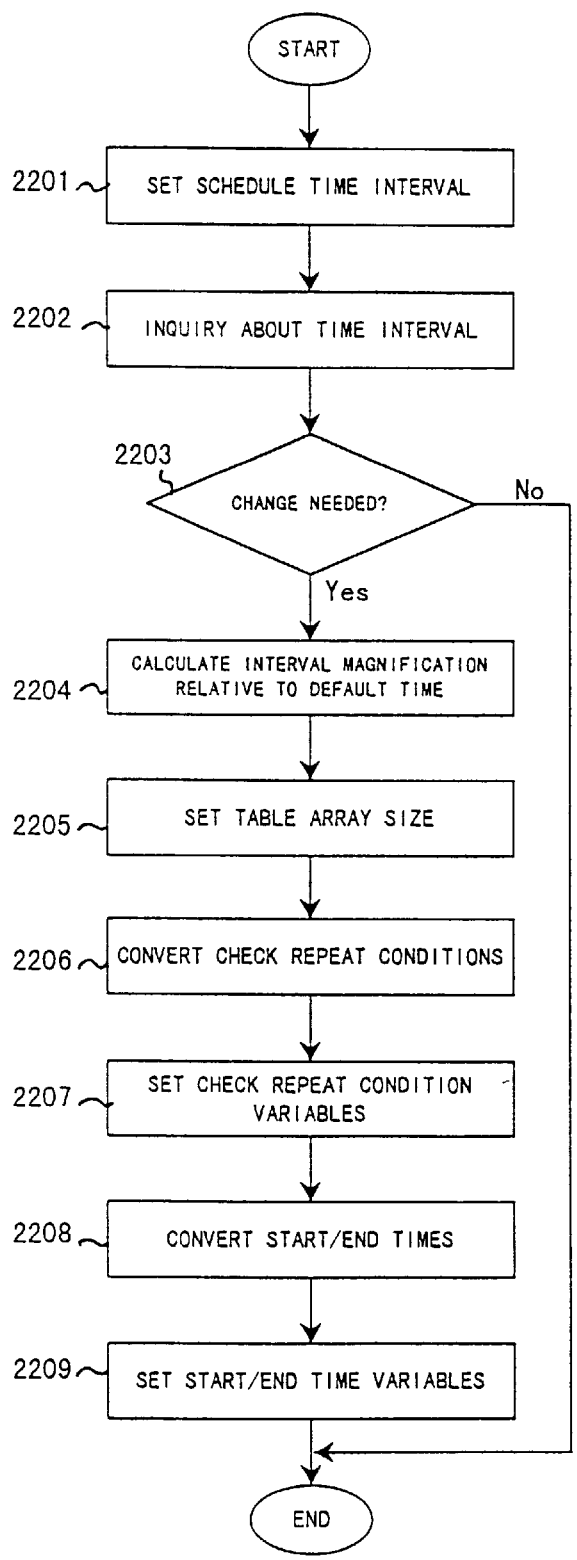
FIG. 22 is an operational flowchart for the contention checking process (No. 4)

FIG. 21 shows a configuration for implementing a fourth contention checking function at the time of reservation control by the reservation controlling section 305, and FIG. 22 is a flowchart for the control operation of an allocation correspondence time conversion processing section 2102 in the contention checking section 2101 of FIG. 21.

According to the contention check processing described in conjunction with FIGS. 16 to 20, schedules can be set in units of one hour as shown in FIG. 20. The configuration of FIG. 21 can vary the time interval in schedule setting to meet the needs of the NMS operator (see FIGS. 6 and 7).

Hereinafter, the control operation of the allocation correspondence time conversion processing section 2102 which is indicated by the flowchart of FIG. 22 will be described.

First, a scheduling time interval is set as specified by the NMS administrator (step 2201 in FIG. 22).

Next, an inquiry is made about the current time interval (step 2202).

As a result of steps 2201 and 2202, a decision is made as to whether or not the scheduling time interval needs to be changed (step 2203). If it does not, the operation comes to an end.

If, on the other hand, the scheduling time interval set in step 2201 differs from the current time interval obtained by the inquiry in step 2202 and hence a change of the scheduling time interval is needed, then an interval magnification relative to the default time is calculated first (steps 2203 and 2204).

Next, the size of an array (see FIG. 20) corresponding to each VC object 1403 in the PVC-VP/VC allocation table 1303 is set (step 2205).

After that, check repeat conditions (the conditions in step 1902 of FIG. 19 for the variable I) are converted (step 2206), check repeat condition variables are set (setting of the start time in the variable I in step 1902 of FIG. 19, etc.) (step 2207), the start and end times are converted (step 2208), and the times are set in the variables (step 2209). Then, the operation of the allocation correspondence time conversion processing section 2102 terminates.

The above control processing allows the NMS administrator to change the scheduling time interval according to the allowance for bandwidth, the accuracy required of schedule contention check, and the performance of check processing. Thus, more accurate PVC connection reservation control becomes possible.

Contention Checking Function (Fifth Function)

Figure 23:
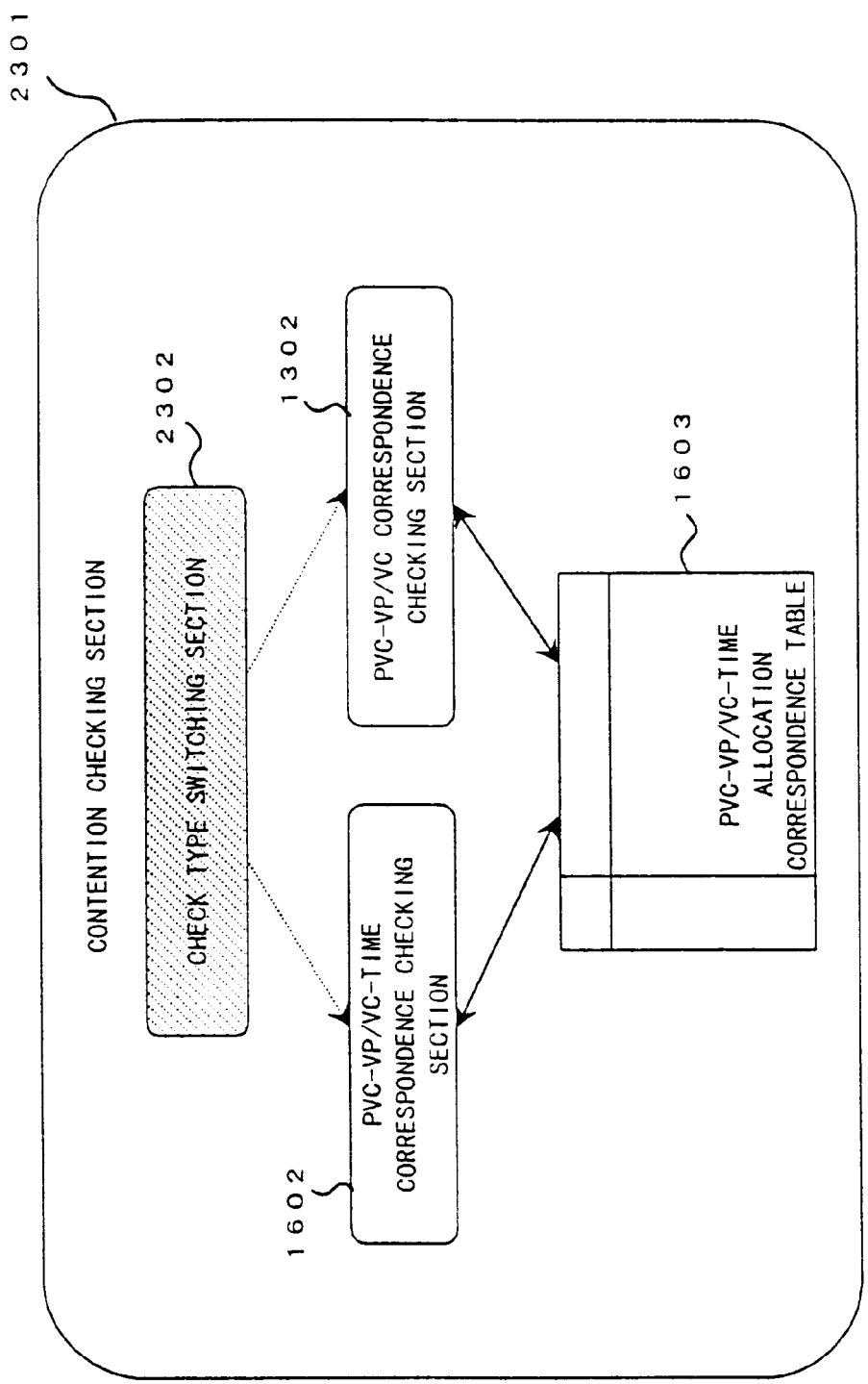
FIG. 23 shows a configuration (No. 5) of the contention checking section.
Figure 24:
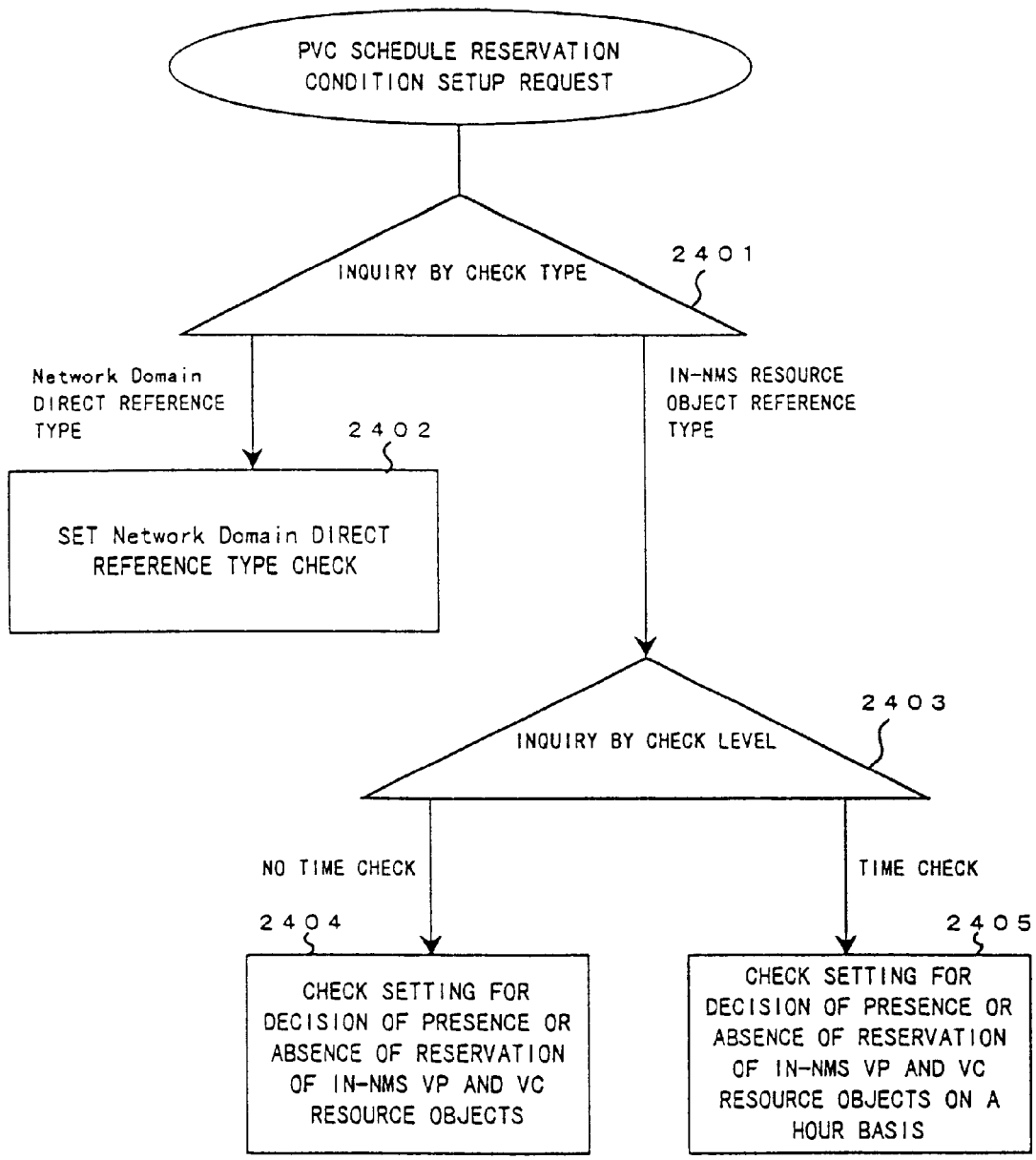
FIG. 24 is an operational flowchart for the contention checking process (No. 5)

FIG. 23 shows a configuration for implementing a fifth contention checking function at the time of reservation control by the reservation controlling section 305, and FIG. 24 is a flowchart for the control operation of a check type switching section 2302 in the contention checking section 2301 of FIG. 23.

In issuing schedule contention check requests, the NMS operator or the NMS administrator who operates the NMS server 201 from a local terminal 203 or remote terminal 204 of FIG. 2 can issue contention check requests in a hierarchy of two stages of inquiries by check type and inquiries by check level.

When a contention check request which is of a network domain direct reference type as an inquiry by check type is issued, contention check control described previously in conjunction with FIGS. 11 and 12 is carried out (steps 2401 and 2402 of FIG. 24).

On the other hand, when a contention check request is issued which is of an in-NMS resource object reference type as an inquiry by check type but is of no time check as an inquiry by check level, contention check control is performed by the PVC-VP/VC correspondence checking section 1302 of FIG. 13 (steps 2401, 2403 and 2404 in FIG. 24).

Further, when a contention check request is issued which is of the in-NMS resource object reference type as an inquiry by check type but is of time check as an inquiry by check level, contention check control is performed by the PVC-VP/VC-time correspondence checking section 1602 of FIG. 16 (steps 2403 and 2405 in FIG. 24).

Thus, the above control operation allows the way of scheduling a PVC connection to be changed flexibly as requested by the NMS operator or the like by combining inquiries by check type and check level.

Examples of Commands

Finally, a description will be given of examples of Retrieve commands by elements issued by the protocol managing section 307 in the NMS server 201 of FIG. 3 to the NE 202.

First, the following is a command for a request to collect data on a VC set in the office equipment (OE) which is a communications unit in the NE 202.

RTRV-VC: <ffffffsuuc-xxxx-xxxx>

The following is a command for a request to collect data on a VP/VC connection set in the OE in the NE 202.

RTRV-CONN::OE=ffffffsuuc VPI=xxxx][CI=xxxx]

where ffffff is the frame number of the cabinet, s the rack number, uu the unit number, c the card number, and xxxx the VPI/VCI.

By each of the exemplary Retrieve commands by elements, information specified in the NE 202 is returned as a response to the NMS server 201.

Supplement to Recording Medium Recorded With a Program for Implementing the Present Embodiment When used by a computer, the present invention can be implemented in the form of a computer readable storage medium which causes the computer to perform the same functions as the functions implemented by the configurations described so far.

Figure 25:
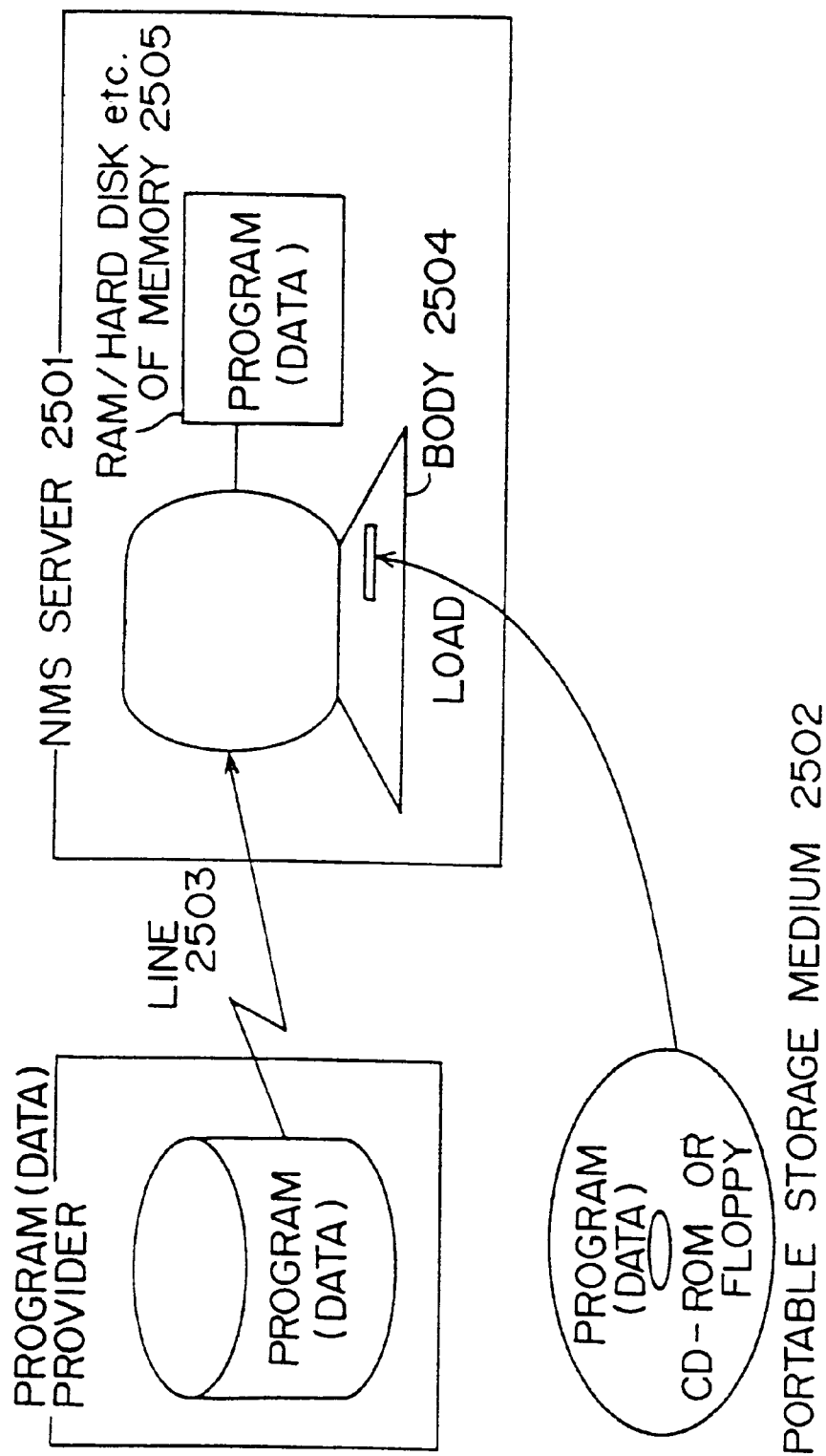
FIG. 25 is a diagram for use in explanation of a storage medium recorded with a program for implementing the system of the present invention.

In this case, as shown in FIG. 25, a program for performing the various functions of the preferred embodiment of the present invention is loaded into a memory (a RAM or hard disk) 2505 installed within the body 2504 of an NMS server 2501 for execution from a portable storage medium 2502, such as a floppy disk, a CD-ROM disk, an optical disk, a removable hard disk, or the like, or over a network line 2503.

What is claimed is:

1. A device for performing reservation control to set up a permanent virtual connection using virtual connection units on an information communications network by making communications with network element devices which comprise the information communications network, comprising:

permanent virtual connection setup management unit managing data used for setting up the permanent virtual connection;

reservation controlling unit controlling a schedule set for the permanent virtual connection managed by the permanent virtual connection setup management unit; and active/inactive state controlling unit responsive to a request issued by the reservation controlling unit to switch a state of any said permanent virtual connection for switching the permanent virtual connection managed by the permanent virtual connection setup management unit between active and inactive states and issuing a request to network element devices that hold resources which will be used by the permanent virtual connection for changing the states of the resources.

2. The device according to claim 1, wherein the reservation controlling unit includes fixed-interval setting reservation unit reserving the setup of the permanent virtual connection for a given fixed interval; periodic setting reservation unit reserving the setup of the permanent virtual connection periodically; time monitoring timer unit performing time monitoring according to the contents of reservation by the fixed-interval setting reservation unit or the periodic setting reservation unit; and state switching request issuing unit responsive to the results of the time monitoring unit for issuing the request for switching the states of the resources to the active/inactive state controlling unit.

3. The device according to claim 1, further comprising contention checking unit checking whether or not, in a schedule set by the reservation controlling unit the permanent virtual connection, the resources of the network element devices that are used by the permanent virtual connection are used by another schedule already set by the reservation controlling unit.

4. The device according to claim 3, wherein the contention checking unit includes network element equipment inquiring/checking unit inquiring of the network element devices to check whether or not, in a schedule set by the reservation controlling unit the permanent virtual connection, the resources of the pieces of network element equipment that are to be used by the permanent virtual connection are used overlapping with another schedule already set by the reservation controlling unit.

5. The device according to claim 3, wherein the contention checking unit includes permanent virtual connection-resource correspondence storage unit storing a correspondence relationship between the permanent virtual connection and the resources of the network element devices that are used by the permanent virtual connection, and permanent virtual connection-resource correspondence checking unit the permanent virtual connection, the resources of the network element devices that are to be used by the permanent virtual connection are used overlapping with another schedule already set by the reservation controlling unit.

6. The device according to claim 3, wherein the contention checking unit includes permanent virtual connectionresource-time correspondence storage unit storing a correspondence relationship among the permanent virtual connection, the resources of the network element devices that are used by the permanent virtual connection, and the time interval for which the permanent virtual connection is set up, and permanent virtual connection-resource-time correspondence checking unit referencing the permanent virtual connection-resource-time correspondence storage unit to check whether or not, in a schedule set by the reservation controlling unit controlling the permanent virtual connection, the resources of the network element devices that are to be used by the permanent virtual connection are used overlapping with another schedule already set by the reservation controlling unit in units of a predetermined time interval.

7. The device according to claim 6, wherein the contention checking unit a changing unit changing the unit of a predetermined time interval.

8. The device according to claim 3, wherein the contention checking unit includes network element equipment inquiring/checking unit inquiring of the network element devices to check whether or not, in a schedule set by the reservation controlling unit controlling the permanent virtual connection, the resources of the network element devices that are to used by the permanent virtual connection are used overlapping with another schedule already set by the reservation controlling unit, permanent virtual connection-resource correspondence storage unit storing a correspondence relationship between the permanent virtual connection and the resources of the pieces of network element equipment that are used by the permanent virtual connection, permanent virtual connection-resource correspondence checking unit referencing the permanent virtual connection-resource correspondence storage unit to check whether or not, in a schedule set by the reservation controlling unit controlling the permanent virtual connection, the resources of the network element devices that are to be used by the permanent virtual connection are used overlapping with another schedule already set by the reservation controlling unit permanent virtual connection-resource-time correspondence storage unit storing a correspondence relationship among the permanent virtual connection, the resources of the network element devices that are used by the permanent virtual connection, and the time interval for which the permanent virtual connection is set up, permanent virtual connection-resource-time correspondence checking unit referencing the permanent virtual connection-resource-time correspondence storage unit to check whether or not, in a schedule set by the reservation controlling unit controlling the permanent virtual connection, the resources of the network element devices that are to be used by the permanent virtual connection are used overlapping with another schedule already set by the reservation controlling unit in units of a predetermined time interval, and control switching unit switching control among the network element equipment inquiring/checking unit, the permanent virtual connection-resource correspondence checking unit, and the permanent virtual connection-resource unit, and the permanent virtual connection-resource-time correspondence checking unit.

9. A computer-readable recording medium which, when used by a computer for performing reservation control to set up a permanent virtual connection using virtual connection units on an information communications network by making communications with network element devices which comprise the information communications network, causes the computer to perform:

a permanent virtual connection setup management function of managing data used for setting up the permanent virtual connection;

a reservation controlling function of controlling a schedule set for the permanent virtual connection managed by the permanent virtual connection setup management function; and an active/inactive state controlling function of, in response to a request issued by a reservation controlling unit to switch the state of the permanent virtual connection, switching the permanent virtual connection managed by the permanent virtual connection setup management function between active and inactive states and issuing a request to network element devices that hold resources which will be used by the permanent virtual connection for changing the states of the resources.

10. The computer-readable recording medium according to claim 9, wherein the reservation controlling function includes a fixed-interval reservation function of reserving the setup of the permanent virtual connection for a given fixed interval, a periodic reservation function of reserving the setup of the permanent virtual connection periodically, a time monitoring timer function of performing time monitoring according to the contents of reservation by the fixed-interval reservation unit or the periodic reservation unit, and a state switching request issuing function of, in response to the results of the time monitoring, issuing the request for switching the states of the resources to the active/inactive state controlling unit.

11. The computer-readable recording medium according to claim 9, further comprising contention checking unit checking whether or not, in a schedule set by the reservation controlling unit controlling the permanent virtual connection, the resources of the network element devices that are used by the permanent virtual connection are used by another schedule already set by the reservation controlling unit.

12. The computer-readable recording medium according to claim 11, wherein the contention checking function includes a network element equipment inquiring/checking function of inquiring of the network element devices to check whether or not, in a schedule set by the reservation controlling unit for the permanent virtual connection, the resources of the pieces of network element equipment that are to be used by the permanent virtual connection are used overlapping with another schedule already set by the reservation controlling function.

13. The computer-readable recording medium according to claim 11, wherein the contention checking function includes a function of storing a correspondence relationship between the permanent virtual connection and the resources of the network element devices that are used by the permanent virtual connection in the form of a permanent virtual connection-resource correspondence table, and a permanent virtual connection-resource correspondence checking function of referencing the permanent virtual connection-resource correspondence table to check whether or not, in a schedule set by the reservation controlling unit controlling the permanent virtual connection, the resources of the network element devices that are to be used by the permanent virtual connection are used overlapping with another schedule already set by the reservation controlling function.

14. The computer-readable recording medium according to claim 11, wherein the contention checking function includes a function of storing a correspondence relationship among the permanent virtual connection, the resources of the network element devices that are used by the permanent virtual connection, and the time interval for which the permanent virtual connection is set up in the form of a permanent virtual connection-resource-time correspondence table, and a permanent virtual connection-resource-time correspondence checking function of referencing the permanent virtual connection-resource-time correspondence table to check whether or not, in a schedule set by the reservation controlling unit controlling the permanent virtual connection, the resources of the network element devices that are to be used by the permanent virtual connection are used overlapping with another schedule already set by the reservation controlling function in units of a predetermined time interval.

15. A method of performing reservation control to set up a permanent virtual connection using virtual connection units on an information communications network by making communications with network element devices which comprise the information communications network, comprising the steps of:

managing data used for setting up the permanent virtual connection;

performing reservation control to control a schedule set for the permanent virtual connection managed; and in response to a request issued as the result of the reservation control, switching the state of the permanent virtual connection for switching the permanent virtual connection managed between active and inactive states and issuing a request to network element devices that hold resources which will be used by the permanent virtual connection for changing the states of the resources.

16. The method according to claim 15, wherein the reservation control step includes the steps of reserving the setup of the permanent virtual connection on a fixed-interval basis, reserving the setup of the permanent virtual connection on a periodic basis, performing time monitoring according to the contents of reservation on a fixed-interval or periodic basis, and, in response to the results of the time monitoring, issuing the request for switching the states of the resources to the active/inactive state controlling function.

17. The method according to claim 15, further comprising the step of checking whether or not, in a schedule set by the reservation control for the permanent virtual connection, the resources of the network element devices that are used by the permanent virtual connection are used by another schedule already set by the reservation control.

18. The computer-readable recording medium according to claim 17, wherein the step of checking includes a step of inquiring of the network element devices to check whether or not, in a schedule set by the reservation controlling unit controlling the permanent virtual connection, the resources of the network element devices that are to be used by the permanent virtual connection are used overlapping with another schedule already set by the reservation control.

19. The computer-readable recording medium according to claim 17, wherein the step of checking includes the steps of storing a correspondence relationship between the permanent virtual connection and the resources of the network element devices that are used by the permanent virtual connection in the form of a permanent virtual connection-resource correspondence table, and referencing the permanent virtual connection-resource correspondence table to check whether or not, in a schedule set by the reservation controlling unit controlling the permanent virtual connection, the resources of the network element devices that are to be used by the permanent virtual connection are used overlapping with another schedule already set by the reservation control.

20. The computer-readable recording medium according to claim 17, wherein the step of checking includes the steps of storing a correspondence relationship among the permanent virtual connection, the resources of the network element devices that are used by the permanent virtual connection, and the time interval for which the permanent virtual connection is set up in the form of a permanent virtual connection-resource-time correspondence table, and of referencing the permanent virtual connection-resource-time correspondence table to check whether or not, in a schedule set by the reservation control for the permanent virtual connection, the resources of the network element devices that are to be used by the permanent virtual connection are used overlapping with another schedule already set by the reservation control in units of a predetermined time interval.

* * * * *